United States Patent
Yamamoto et al.

(10) Patent No.: US 11,874,224 B2
(45) Date of Patent: Jan. 16, 2024

(54) SAMPLE OBSERVATION DEVICE AND SAMPLE OBSERVATION METHOD

(71) Applicant: HAMAMATSU PHOTONICS K.K., Hamamatsu (JP)

(72) Inventors: Satoshi Yamamoto, Hamamatsu (JP); Masanori Matsubara, Hamamatsu (JP); Norikazu Sugiyama, Hamamatsu (JP); Masanori Kobayashi, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 402 days.

(21) Appl. No.: 16/631,927

(22) PCT Filed: May 30, 2018

(86) PCT No.: PCT/JP2018/020829
§ 371 (c)(1),
(2) Date: Jan. 17, 2020

(87) PCT Pub. No.: WO2019/021621
PCT Pub. Date: Jan. 31, 2019

(65) Prior Publication Data
US 2020/0158633 A1 May 21, 2020

(30) Foreign Application Priority Data
Jul. 26, 2017 (JP) .................................. 2017-144603

(51) Int. Cl.
*G01N 21/51* (2006.01)
*G01N 1/20* (2006.01)
(Continued)

(52) U.S. Cl.
CPC ............ *G01N 21/51* (2013.01); *G01N 1/2035* (2013.01); *G01N 21/534* (2013.01); *G02B 5/04* (2013.01);
(Continued)

(58) Field of Classification Search
CPC .... G01N 21/51; G01N 1/2035; G01N 21/534; G01N 2021/1765; G01N 2021/4769;
(Continued)

(56) References Cited

U.S. PATENT DOCUMENTS 3,705,771 A * 12/1972 Friedman ........... G01N 15/1459
356/342
3,910,702 A * 10/1975 Corll .................. G01N 15/1459
250/222.2
(Continued)

FOREIGN PATENT DOCUMENTS

CN           1208918 A     2/1999
CN           101765737 A * 6/2010    ............. B60K 35/00
(Continued)

OTHER PUBLICATIONS

International Preliminary Report on Patentability dated Feb. 6, 2020 for PCT/JP2018/020829.
(Continued)

*Primary Examiner* — Mohamed K Amara
(74) *Attorney, Agent, or Firm* — Faegre Drinker Biddle & Reath LLP

(57) ABSTRACT

A sample observation device includes a flow cell in which a fluid containing samples flows, an irradiation unit configured to irradiate the samples flowing in the flow cell with planar light, an image formation unit having an observation axis inclined with respect to an irradiation surface for the planar light, and configured to form an image of observation light generated in the sample due to the irradiation with the (Continued)

planar light, a two-dimensional imaging element configured to capture a light image including at least a cross section of the fluid among light images according to the observation light formed by the image formation unit, and outputs image data, and an analysis unit configured to analyze a light intensity profile of the sample in a flow direction of the fluid on the basis of the image data.

22 Claims, 17 Drawing Sheets

(51) Int. Cl.
    *G01N 21/53*     (2006.01)
    *G02B 5/04*     (2006.01)
    *G01N 21/17*     (2006.01)
    *G01N 21/47*     (2006.01)

(52) U.S. Cl.
    CPC .......... *G01N 2021/1765* (2013.01); *G01N 2021/4769* (2013.01)

(58) Field of Classification Search
    CPC ..... G01N 2015/1006; G01N 2015/144; G01N 15/1434; G01N 15/147; G01N 15/1475; G01N 15/1459; G01N 15/1463; G01N 17/00; G01N 21/031; G01N 21/05; G01N 21/6428; G01N 2015/1443; G01N 2015/1445; G01N 2015/1472; G01N 2015/1452; G01N 2015/1479; G01N 2021/6417; G01N 2021/058; G01N 21/6456; G01N 21/85; G02B 5/04; G02B 21/0076; G02B 21/16; G02B 21/361; G02B 21/367; G02B 21/0032; G02B 21/00; G02B 21/002; G02B 27/0012; G02B 27/1013; G02B 27/126; G02B 27/145; G02B 27/144; G02B 27/148; G02B 7/28

See application file for complete search history.

(56) References Cited

U.S. PATENT DOCUMENTS

| | | | | |
|---|---|---|---|---|
| 3,960,449 | A * | 6/1976 | Carleton | G01N 21/53 356/340 |
| 4,498,766 | A * | 2/1985 | Unterleitner | G01N 15/1434 356/73 |
| 5,121,988 | A * | 6/1992 | Blesener | G01N 15/1434 356/442 |
| 5,671,046 | A * | 9/1997 | Knowlton | G01N 15/1404 356/336 |
| 6,067,157 | A * | 5/2000 | Altendorf | G01N 15/147 356/337 |
| 6,784,981 | B1 * | 8/2004 | Roche | G01N 15/1459 356/336 |
| 6,919,960 | B2 * | 7/2005 | Hansen | G01N 33/04 356/436 |
| 7,009,171 | B2 * | 3/2006 | Sasaki | G02B 21/002 250/234 |
| 7,075,647 | B2 * | 7/2006 | Christodoulou | G01N 15/1459 356/339 |
| 7,113,266 | B1 * | 9/2006 | Wells | G01N 15/1404 356/336 |
| 7,751,041 | B2 * | 7/2010 | Haga | G01N 21/6428 356/417 |
| 8,427,642 | B2 * | 4/2013 | Mitchell | G01N 15/1463 356/343 |
| 8,780,181 | B2 * | 7/2014 | Olesen | G06V 20/693 348/45 |
| 8,947,662 | B1 * | 2/2015 | Yufa | G01N 21/85 356/343 |
| 9,562,858 | B2 * | 2/2017 | Sano | G01N 33/49 |
| 9,671,332 | B2 * | 6/2017 | Christensen | G01N 21/3504 |
| 9,753,021 | B2 * | 9/2017 | Garidel | G01N 15/00 |
| 9,841,593 | B2 * | 12/2017 | Olesen | G01N 15/1475 |
| 9,849,225 | B2 * | 12/2017 | Barrett | G01N 21/0303 |
| 9,891,155 | B2 * | 2/2018 | Eising | G01N 15/1459 |
| 10,649,196 | B2 * | 5/2020 | Osawa | G02B 27/58 |
| 10,831,014 | B2 * | 11/2020 | Hillman | G02B 21/0052 |
| 11,237,095 | B2 * | 2/2022 | Rodier | G01N 15/1429 |
| 2002/0057432 | A1 * | 5/2002 | Ortyn | G02B 27/144 356/338 |
| 2002/0071121 | A1 | 6/2002 | Ortyn et al. | |
| 2003/0112432 | A1 * | 6/2003 | Yguerabide | G01N 33/54346 356/417 |
| 2006/0274309 | A1 * | 12/2006 | Cerni | G01N 15/1459 356/338 |
| 2007/0146873 | A1 * | 6/2007 | Ortyn | G02B 27/0075 359/386 |
| 2007/0154938 | A1 * | 7/2007 | Oshida | G01N 21/6452 356/320 |
| 2010/0201784 | A1 * | 8/2010 | Lippert | G02B 21/244 348/46 |
| 2010/0225913 | A1 * | 9/2010 | Trainer | G01N 15/0205 356/338 |
| 2011/0261164 | A1 * | 10/2011 | Olesen | G06V 20/693 382/128 |
| 2011/0294139 | A1 * | 12/2011 | Takeda | G01N 33/56966 435/7.1 |
| 2012/0140223 | A1 | 6/2012 | Mitchell et al. | |
| 2014/0353522 | A1 * | 12/2014 | Wu | G01N 15/1434 250/458.1 |
| 2017/0045441 | A1 * | 2/2017 | Nciri | G01J 3/10 |
| 2018/0038783 | A1 * | 2/2018 | Yamamoto | G01N 15/1404 |
| 2019/0014985 | A1 * | 1/2019 | Kobayashi | A61B 5/0071 |
| 2019/0033291 | A1 * | 1/2019 | Okada | G01N 1/10 |
| 2019/0353884 | A1 * | 11/2019 | Hedde | G01N 21/6458 |
| 2020/0158633 | A1 * | 5/2020 | Yamamoto | G02B 21/16 |
| 2020/0240893 | A1 * | 7/2020 | Matsuda | G01N 15/1459 |
| 2021/0010920 | A1 * | 1/2021 | Taniguchi | G02B 21/0032 |
| 2022/0120660 | A1 * | 4/2022 | Kikuchi | G01N 15/1404 |

FOREIGN PATENT DOCUMENTS

| | | | |
|---|---|---|---|
| CN | 104897591 A | 9/2015 | |
| EP | 3144662 A1 | 3/2017 | |
| JP | 2000-214068 A | 8/2000 | |
| JP | 2002-171446 A | 6/2002 | |
| JP | 2011-505578 A | 2/2011 | |
| JP | 2011-133460 A | 7/2011 | |
| JP | 2016-524703 A | 8/2016 | |
| JP | 2016-537670 A | 12/2016 | |
| JP | 2017-501429 A | 1/2017 | |
| JP | 2017-58352 A | 3/2017 | |
| JP | 7207860 B2 * | 1/2023 | ......... G02B 21/0032 |
| WO | WO-2009043472 A2 * | 4/2009 | ......... G02B 21/002 |
| WO | WO 2009/073652 A1 | 6/2009 | |
| WO | WO-2010080642 A1 * | 7/2010 | ............ G01J 3/02 |
| WO | WO-2014/186461 A1 | 11/2014 | |
| WO | WO 2015/071361 A1 | 5/2015 | |
| WO | WO 2015/071363 A1 | 5/2015 | |

OTHER PUBLICATIONS

Raju Regmi et al., "Light sheet based imaging flow cytometry on a microfluidic platform: Light Sheet Based Microfluidic Devices", Microscopy Research and Technique, vol. 76, No. 11, Nov. 1, 2013, p. 1101-p. 1107, XP055776267.

Greivenkamp John E et al, "Field Guide to Geometrical Optics", Retrieved from the Internet: URL: https://www.spiedigitallibrary.org/ebook/Download?fullDOI=10.1117%2F3.547461&isFullBook=True, Jan. 20, 2004, XP055804575.

* cited by examiner (a)

(b)

(a)

(b)

(a)

(b)

SAMPLE OBSERVATION DEVICE AND SAMPLE OBSERVATION METHOD

TECHNICAL FIELD

The present invention relates to a sample observation device and a sample observation method.

BACKGROUND ART

An example of a device that observes the inside of a sample having a three-dimensional structure such as a cell is a flow cytometer using a time delay integration (WI) type image sensor described in Patent Literature 1, for example. A flow cell is designed on the basis of fluid dynamics, and a laminar flow is formed in the flow cell by a flow of a sample suspension liquid (a sample flow) including a sample and a flow of sheath liquid (a sheath flow). Hydrodynamic focusing occurs in the sample flow by setting a pressure of the sample flow to be slightly lower than a pressure of the sheath flow. Accordingly, a flow diameter of the sample flow surrounded by the sheath flow becomes very small, and fine samples can sequentially flow into the flow cell.

PRIOR ART LITERATURE

Patent Literature

[Patent Literature 1] US Patent Application Publication No. 2002/0071121

SUMMARY OF INVENTION

Technical Problem

In qualitative measurement such as cell antigen measurement using a flow cytometer, the pressure of a sample flow is set to be high and a flow rate of the sample flow is increased, such that a throughput until sample analysis results are obtained can be secured. However, when the throughput is improved, there is concern that resolution will decrease or a background caused by autofluorescent light generated from the fluid in the flow cell will increase.

The present invention has been made to solve the above problems, and an object of the present invention is to provide a sample observation device and a sample observation method capable of appropriately performing observation of samples even when a throughput is improved.

Solution to Problem

A sample observation device according to an aspect of the present invention includes a flow cell in which a fluid containing samples flows; an irradiation unit configured to irradiate the samples flowing in the flow cell with planar light; an image formation unit having an observation axis inclined with respect to an irradiation surface for the planar light, and configured to form an image of observation light generated in the sample due to the irradiation with the planar light; a two-dimensional imaging element configured to capture a light image including at least a cross section of the fluid among light images according to the observation light formed by the image formation unit, and output image data; and an analysis unit configured to analyze a light intensity profile of the sample in a flow direction of the fluid on the basis of the image data.

In the sample observation device, the sample flowing in the flow cell is irradiated with the planar light, and the observation light from the sample is formed as an image by the image formation unit having the observation axis inclined with respect to the irradiation surface for the planar light. Further, the observation light formed as an image by the image formation unit is imaged by the two-dimensional imaging element, and image data based on the light image including at least a cross section of the fluid is generated. Therefore, even when there are a plurality of samples in the cross section of the fluid, the analysis unit can separate the observation light from the respective samples and analyze the light intensity profile. Therefore, even when the throughput has been improved, the samples can be appropriately observed.

Further, an optical axis of the planar light according to the irradiation unit may be orthogonal to an incidence surface of the planar light in the flow cell. In this case, position correction or the like of the image data acquired by the two-dimensional imaging element becomes unnecessary, and a light intensity profile analysis process can be facilitated.

Further, an optical axis of the planar light according to the irradiation unit may be orthogonal to the flow direction of the fluid in the flow cell. In this case, position correction or the like of the image data acquired by the two-dimensional imaging element becomes unnecessary, and a light intensity profile analysis process can be facilitated.

Further, the analysis unit may analyze a flow rate of the sample on the basis of the image data. A flow rate of the sample flow in the flow cell may be different between a center side of the sample flow and surroundings thereof. In this case, it is conceivable that it would be difficult to discriminate whether a difference in light intensity profile between the samples is based on a difference in size between the samples or on a difference between flow rates. Therefore, when the flow rate of the sample is analyzed, flow rate unevenness of the sample flow can be allowed, and control of flow cytometry is facilitated.

Further, the analysis unit may correct the light intensity profile on the basis of the flow rate of the sample. In this case, analysis accuracy of the sample can be increased through correction of the light intensity profile.

Further, the two-dimensional imaging element may capture, through subarray readout, the light image including at least a cross section of the fluid among the light images according to the observation light formed by the image formation unit. In this case, since a frame rate of the two-dimensional imaging element can be increased, further improvement of a throughput can be achieved.

Further, the image formation unit may include an objective lens, and a first optical element disposed between the flow cell and the objective lens, and the first optical element may be an optical element having a refractive index greater than that of a disposition space of the image formation unit and configured to increase an inclination angle with respect to an irradiation surface for the planar light of the observation light emitted from the sample as compared with a case in which the first optical element is not disposed. Improvement of the Z-direction resolution of the observation image can be achieved due to the disposition of the first optical element even when the observation axis of the image formation unit is inclined with respect to the irradiation surface for the planar light.

Further, the first optical element may be a wedge prism. In this case, reduction of an astigmatism of the observation light can be achieved.

Further, the first optical element may be a doublet prism that is a combination of a pair of wedge prisms. In this case, reduction of a chromatic aberration of the observation light can be achieved.

Further, the image formation unit may include an image formation lens disposed on a rear side of the objective lens, and a second optical element disposed between the image formation lens and the two-dimensional imaging element, and the second optical element may be a non-axisymmetric optical element configured to bend rays on one axis of the observation light and not to bend rays on the other axis orthogonal to the one axis. With this disposition of the second optical element, reduction of the astigmatism of the observation light can be further achieved.

Further, the second optical element may be a wedge prism. Reduction of an astigmatism of the observation light can be further achieved.

Further, the second optical element may be a doublet prism that is a combination of a pair of wedge prisms. In this case, reduction of a chromatic aberration of the observation light can be further achieved.

Further, a sample observation method according to an aspect of the present invention includes a fluid formation step of causing a fluid containing samples to flow in a flow cell; an irradiation step of irradiating the samples flowing in the flow cell with planar light; an image formation step of forming an image of observation light generated in the sample due to the irradiation with the planar light by an image formation unit having an observation axis inclined with respect to an irradiation surface for the planar light; an imaging step of capturing, by a two-dimensional imaging element, a light image including at least a cross section of the fluid among light images according to the observation light formed by the image formation unit, and outputting image data; and an analysis step of analyzing a light intensity profile of the sample in a flow direction of the fluid on the basis of the image data.

In the sample observation method, the sample flowing in the flow cell is irradiated with the planar light, and the observation light from the sample is formed as an image by the image formation unit having the observation axis inclined with respect to the irradiation surface for the planar light. Further, the observation light formed as an image by the image formation unit is imaged by the two-dimensional imaging element, and image data based on the light image including at least a cross section of the fluid is generated. Therefore, even when there are a plurality of samples in the cross section of the fluid, the analysis unit can separate the observation light from the respective samples and analyze the light intensity profile. Therefore, even when the throughput has been improved, the samples can be appropriately observed.

Further, the irradiation step may include causing an optical axis of the planar light to be orthogonal to an incidence surface of the planar light in the flow cell. In this case, position correction or the like of the image data acquired by the two-dimensional imaging element becomes unnecessary, and a light intensity profile analysis process can be facilitated.

Further, the irradiation step may include causing an optical axis of the planar light to be orthogonal to the flow direction of the fluid in the flow cell. In this case, position correction or the like of the image data acquired by the two-dimensional imaging element becomes unnecessary, and a light intensity profile analysis process can be facilitated.

Further, the analysis step may include analyzing a flow rate of the sample on the basis of the image data. A flow rate of the sample flow in the flow cell may be different between a center side of the sample flow and surroundings thereof. In this case, it is conceivable that it would be difficult to discriminate whether a difference in light intensity profile between the samples is based on a difference in size between the samples or on a difference between flow rates. Therefore, when the flow rate of the sample is analyzed, flow rate unevenness of the sample flow can be allowed, and control of flow cytometry is facilitated.

Further, the analysis step may include correcting the light intensity profile on the basis of the flow rate of the sample. In this case, analysis accuracy of the sample can be increased through correction of the light intensity profile.

Further, the imaging step may include capturing, through subarray readout of the two-dimensional imaging element, the light image including at least the cross section of the fluid among the light images according to the observation light formed in the image formation step. In this case, since a frame rate of the two-dimensional imaging element can be increased, further improvement of a throughput can be achieved.

Further, the image formation step may include using an objective lens, and a first optical element disposed between the flow cell and the objective lens, and the first optical element may be an optical element having a refractive index greater than that of a disposition space of the image formation unit and configured to increase an inclination angle with respect to an irradiation surface for the planar light of the observation light emitted from the sample as compared with a case in which the first optical element is not disposed. Improvement of the Z-direction resolution of the observation image can be achieved due to the disposition of the first optical element even when the observation axis of the image formation unit is inclined with respect to the irradiation surface for the planar light.

Further, the first optical element may be a wedge prism. In this case, reduction of an astigmatism of the observation light can be achieved.

Further, the first optical element may be a doublet prism that is a combination of a pair of wedge prisms. In this case, reduction of a chromatic aberration of the observation light can be achieved.

Further, the image formation step may include using an image formation lens disposed on a rear side of the objective lens, and a second optical element disposed between the image formation lens and the two-dimensional imaging element, and the second optical element may be a non-axisymmetric optical element configured to bend rays on one axis of the observation light and not to bend rays on the other axis orthogonal to the one axis. With this disposition of the second optical element, reduction of the astigmatism of the observation light can be further achieved.

Further, the second optical element may be a wedge prism. Reduction of an astigmatism of the observation light can be further achieved.

Further, the second optical element may be a doublet prism that is a combination of a pair of wedge prisms. In this case, reduction of a chromatic aberration of the observation light can be further achieved.

Advantageous Effects of Invention

According to the present invention, samples can be appropriately observed even when a throughput is improved.

DESCRIPTION OF EMBODIMENTS

Hereinafter, preferred embodiments of a sample observation device and a sample observation method according to an aspect of the present invention will be described in detail with reference to the drawings.

Figure 1:
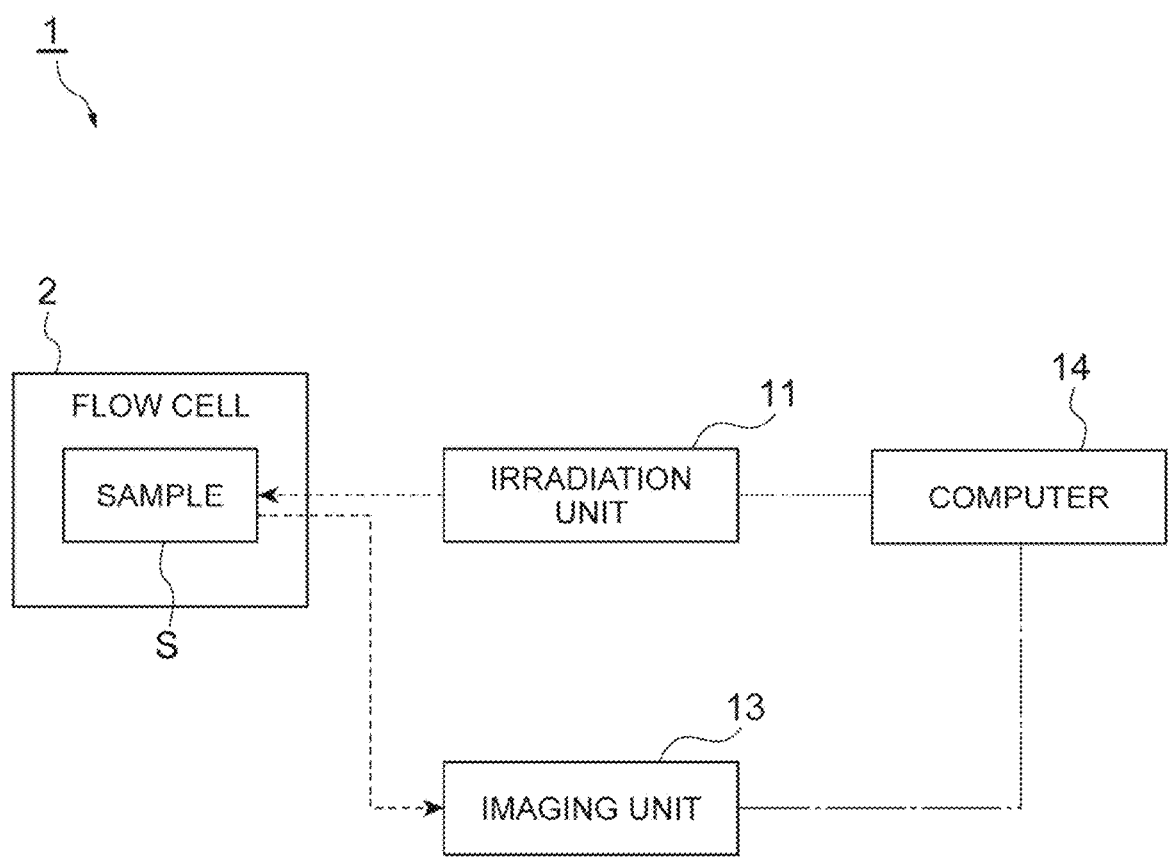
FIG. 1 is a block diagram illustrating an embodiment of a sample observation device.

FIG. 1 is a block diagram illustrating an embodiment of a sample observation device. This sample observation device 1 is a device that causes fluorescent light or scattered light generated in a sample S to be formed as an image on an image formation surface to acquire observation image data of the sample S, and analyzes and evaluates the sample S on the basis of the observation image data. The sample observation device 1 is configured as a flow cytometer including a flow cell 2 through which a fluid containing the sample S flows. Examples of the sample S that is an observation target include a cell and a tissue of a human or animal.

The flow cell 2 through which the fluid containing the sample S flows is designed on the basis of fluid dynamics. A laminar flow is formed of a flow of a sample suspension liquid containing the sample S (hereinafter referred to as a sample flow F1) and a flow of the sheath liquid (hereinafter referred to as a sheath flow F2) in a pipe 5 of the flow cell 2. The fluid that forms the sample flow F1 and the sheath flow F2 is, for example, water.

A pressure of the sample flow F1 and a pressure of the sheath flow F2 are controlled by a compressor (not illustrated). Hydrodynamic focusing occurs in the sample flow F1 by setting the pressure of the sample flow F1 to be slightly lower than the pressure of the sheath flow F2. Accordingly, a flow diameter of the sample flow F1 surrounded by the sheath flow F2 becomes very small, and fine samples S such as cells can sequentially flow into the flow cell 2. In the sample observation device 1, the samples S may pass through an irradiation surface R (see FIG. 2) of the planar light L2 one by one, and a plurality of samples S may pass in an overlapping state in a flow direction or a radial direction of the sample flow F1. Further, these passing states may be mixed.

The pipe 5 constituting the flow cell 2 is formed, for example, in a circular cross section using a member having transparency with respect to the planar light L2 to be described below. Examples of the member having transparency include glass, quartz, and synthetic resin. A side surface portion of the pipe 5 functions as an incidence surface 5a for the planar light L2.

Figure 2:
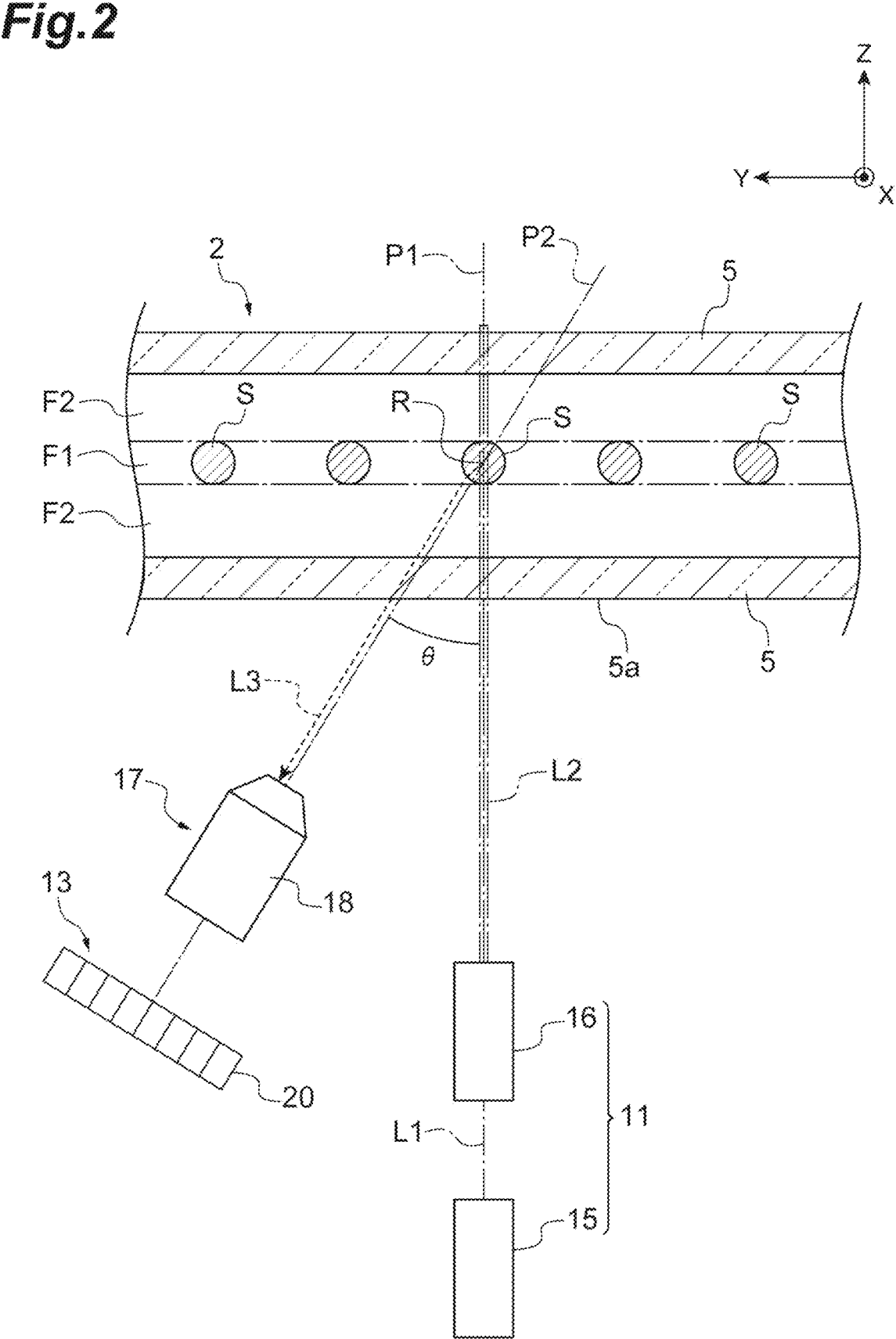
FIG. 2 is a schematic diagram illustrating a configuration example of an irradiation unit, a flow cell, and an image formation unit in the sample observation device illustrated in FIG. 1.

As illustrated in FIG. 1, the sample observation device 1 includes an irradiation unit 11, an imaging unit 13, and a computer 14. The irradiation unit 11 irradiates the sample S with the planar light L2 as excitation light. The irradiation unit 11 includes a light source 15 and a planar light formation unit 16, as illustrated in FIG. 2. The light source 15 outputs light L1 that is a formation source of the planar light L2. Examples of the light source 15 include a laser light source such as a laser diode and a solid-state laser light source. Further, the light source 15 may be a light emitting diode, a super luminescent diode, or a lamp light source. The light L1 output from the light source 15 is guided to the planar light formation unit 16.

The planar light formation unit 16 shapes the light L1 output from the light source 15 into the planar light L2, and irradiates the sample S with the shaped planar light L2 along the optical axis P1. In the embodiment, an optical axis of the planar light formation unit 16 is the optical axis P1 of the planar light L2. The planar light formation unit 16 includes a light shaping element such as a cylindrical lens, an axicon lens, or a spatial light modulator, and is optically coupled to the light source 15. The planar light formation unit 16 may include an objective lens, an optical shutter, and the like.

The sample S flowing through the flow cell 2 is irradiated with the planar light L2 formed by the planar light formation unit 16. Observation light L3 is generated on the irradiation surface R for the planar light L2 due to the irradiation with the planar light L2. The observation light L3 includes, for example, fluorescent light excited at the sample S by the planar light L2, scattered light or diffused reflected light of the planar light L2 scattered on a surface of the sample S, and autofluorescent light generated from the sample flow F1 and the sheath flow F2 flowing in the flow cell 2. In the following description, as illustrated in FIG. 2, a direction of the optical axis P1 of the planar light L2 is referred to as a Z axis, a flow direction of the sample S due to the flow cell 2 is referred to as a Y axis, and a direction orthogonal to the Y axis in a plane orthogonal to the optical axis P1 of the planar light L2 is referred to as an X axis. The irradiation surface R for the planar light L2 in the sample S is a surface in an XZ plane.

When observation is performed in a thickness direction of the sample S, it is preferable for the planar light L2 to be thin planar light having a thickness of 2 mm or less in consideration of resolution. Further, when a thickness of the sample S is very small, that is, when a sample S having a thickness equal to or less than Z-direction resolution is observed, a thickness of the planar light L2 does not affect the resolution. In this case, planar light L2 having a thickness exceeding 2 mm may be used.

In the embodiment, an image formation unit 17 that forms an image of the observation light generated in the sample S due to irradiation with the planar light L2 is provided. As illustrated in FIG. 2, the image formation unit 17 includes, for example, an objective lens 18 and an image formation lens (not illustrated). An optical axis of the image formation unit 17 is an observation axis P2 of the observation light L3. The observation axis P2 of the image formation unit 17 is inclined at an inclination angle $\theta$ with respect to the irradiation surface R for the planar light L2 in the sample S. The inclination angle $\theta$ also coincides with an angle formed by the optical axis P1 of the planar light L2 directed to the sample S and the observation axis P2. The inclination angle $\theta$ is 10° to 80°. The inclination angle $\theta$ is preferably 20° to 70° from the viewpoint of improvement of resolution of the observation image. Further, the inclination angle $\theta$ is more preferably 30° to 65° from the viewpoint of improvement of the resolution of the observation image and stability of the field of view.

The imaging unit 13 captures a light image including at least a cross section of a fluid among the light images of the observation light L3 formed by the image formation unit 17. The imaging unit 13 includes a two-dimensional imaging element 20. An example of the two-dimensional imaging element 20 includes an area image sensor such as a CMOS image sensor and a CCD image sensor. The area image sensor is disposed on an image formation surface of the image formation unit 17 and captures a light image, for example, using a global shutter or a rolling shutter to generate two-dimensional image data (image data).

Figure 3:
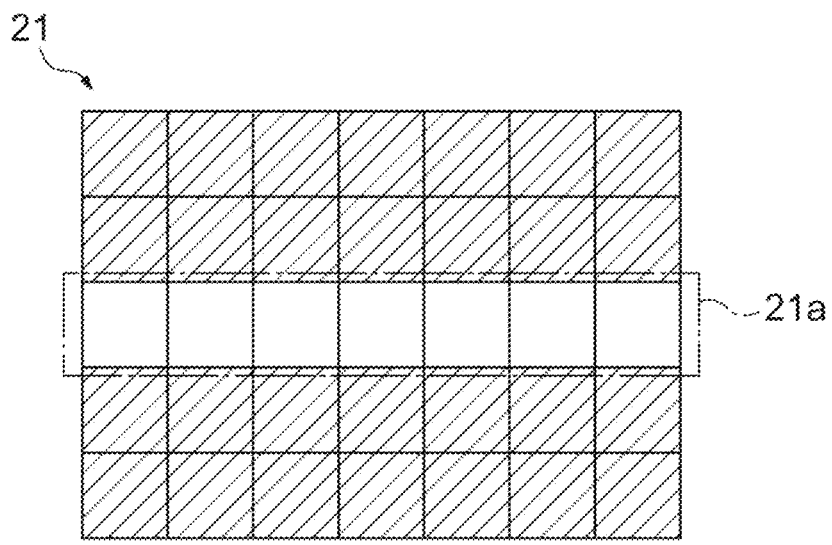
FIGS. 3(a) and (b) are diagrams illustrating a configuration example of an imaging unit.
Figure 3:
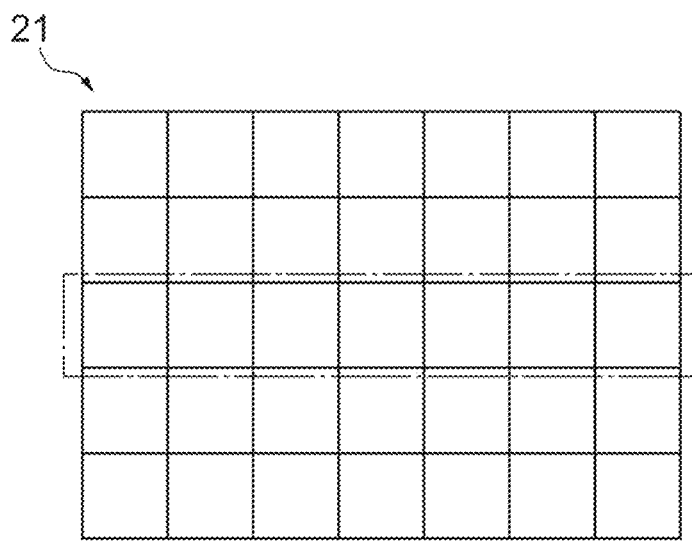

In the two-dimensional imaging element 20, partial image data (image data) may be output by subarray readout. For example, as illustrated in FIG. 3(a), in subarray readout, a subarray can be set in an imaging surface of an area image sensor 21, and only a pixel row 21a included in the set subarray can be read. In this case, the two-dimensional imaging element 20 can partially capture the light image according to the observation light L3 through subarray readout. Further, as illustrated in FIG. 3(b), all pixel rows of the area image sensor 21 may be set as readout areas, and a part of the two-dimensional image may be extracted as partial image data (image data) through a subsequent image processing.

The computer 14 physically includes a memory such as a RAM and a ROM, a processor (an arithmetic circuit) such as a CPU, a communication interface, a storage unit such as a hard disk, and a display unit such as a display. Examples of such a computer 14 include a personal computer, a microcomputer, a cloud server, and a smart device (a smart phone, a tablet terminal, or the like). The computer 14 functions as a controller that controls operations of the light source 15 and the imaging unit 13 by a program stored in the memory being executed by a CPU of a computer system. Further, when the planar light formation unit 16 includes the spatial light modulator, the computer 14 may function as a controller that controls an operation of the spatial light modulator of the planar light formation unit 16.

The computer 14 as the controller receives an input of a measurement start operation from the user, and drives the light source 15 and the imaging unit 13 in synchronization. Accordingly, the sample S flowing in the flow cell 2 is irradiated with the planar light L2, and at least a light image including a cross section of the fluid in the observation light L3 from the irradiation surface R is captured by the imaging unit 13. Image data based on the light image is output to the computer 14. The computer 14 may control the light source 15 so that the light source 15 continuously outputs the light L1, or may control ON/OFF of the output of the light L1 from the light source 15 according to the imaging in the imaging unit 13. Further, when the irradiation unit 11 includes an optical shutter, the computer 14 may turn on/off the irradiation with the light L1 by controlling the optical shutter.

Figure 4:
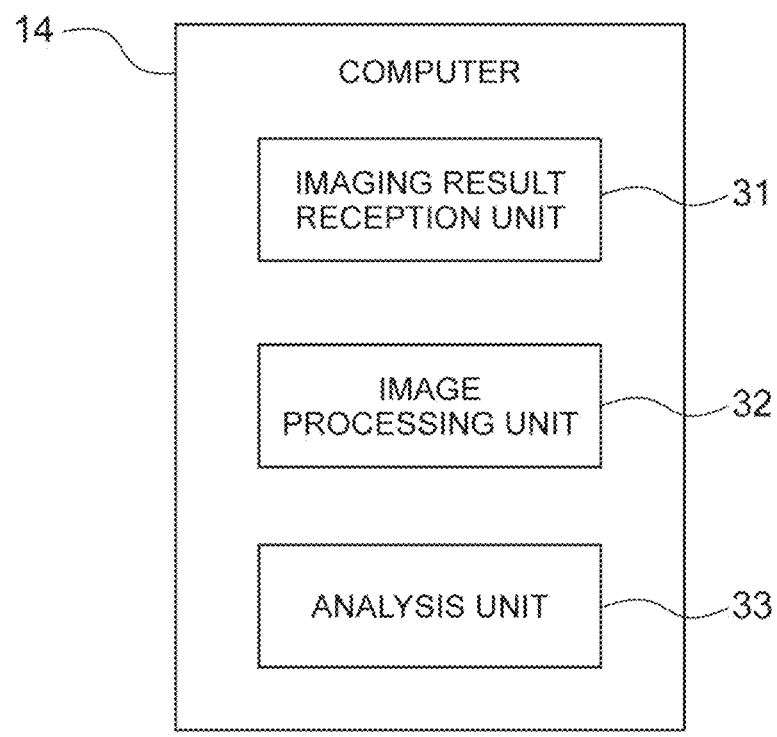
FIG. 4 is a block diagram illustrating an example of functional components of a computer constituting the sample observation device.

Further, the computer 14 includes an imaging result reception unit 31, an image processing unit 32, and an analysis unit 33 as functional components, as illustrated in FIG. 4. The imaging result reception unit 31 is a unit that receives imaging data from the imaging unit 13. That is, the imaging result reception unit 31 receives the image data based on the light image including at least the cross section of the fluid in the light image according to the observation light L3 and outputs the image data to the image processing unit 32.

Figure 5:
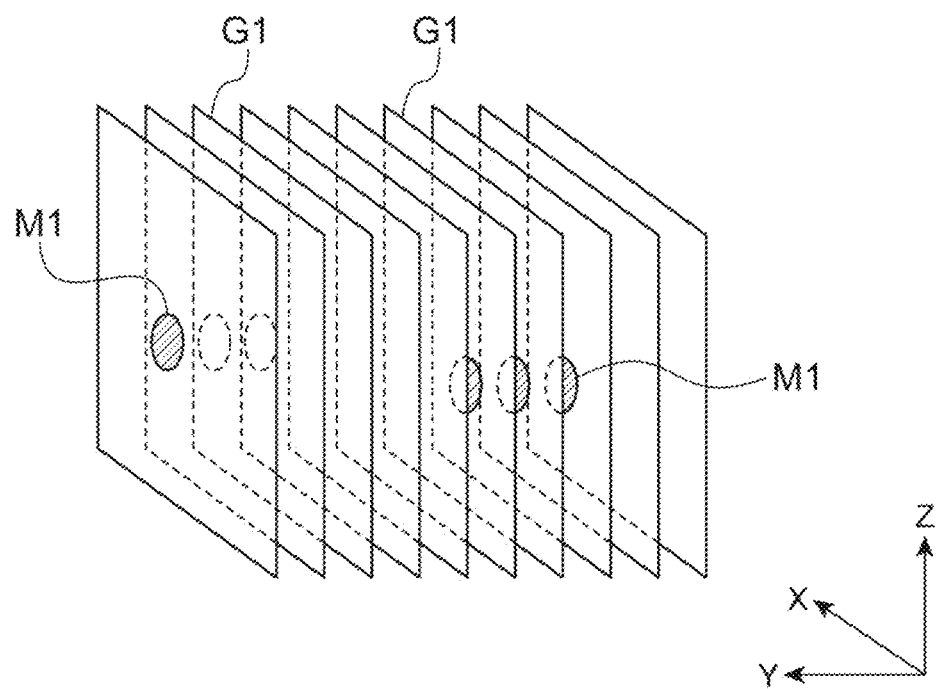
FIGS. 5(a) and (b) are diagrams illustrating examples of generation of an observation image in an image processing unit.
Figure 5:
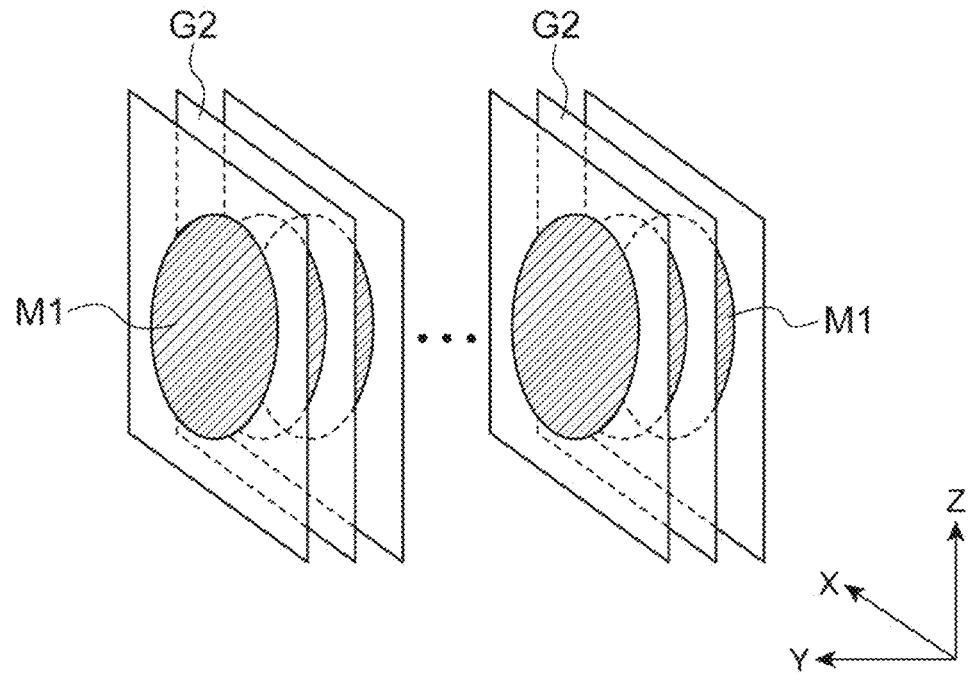

The image processing unit 32 generates an observation image on the basis of the image data output from the imaging result reception unit 31. In the sample observation device 1, the samples S flow in a Y-axis direction in the flow cell 2, and the irradiation surface R for the planar light L2 is located in the XZ plane, as described above. Therefore, a plurality of XZ images G1 based on the image data are output to the image processing unit 32 in the Y-axis direction, as illustrated in FIG. 5(a). The image processing unit 32 specifies pixels constituting an XZ image (an observation image such as a fluorescence image) M1 of the sample S for each XZ image G1, and sets pixel values of pixels that do not constitute the XZ image M1 of the sample S in each XZ image G1 to a predetermined value (for example, zero) to generate an XZ image G1 in which a background has been suppressed. The image processing unit 32 outputs the plurality of generated XZ images G1 to the analysis unit 33 as XYZ data. The image processing unit 32 may extract an XZ image G2 corresponding to a portion including the XZ image M1 of the sample S from each XZ image G1 as illustrated in FIG. 5(b), and output the plurality of XZ images G2 to the analysis unit 33 as XYZ data.

Figure 6:
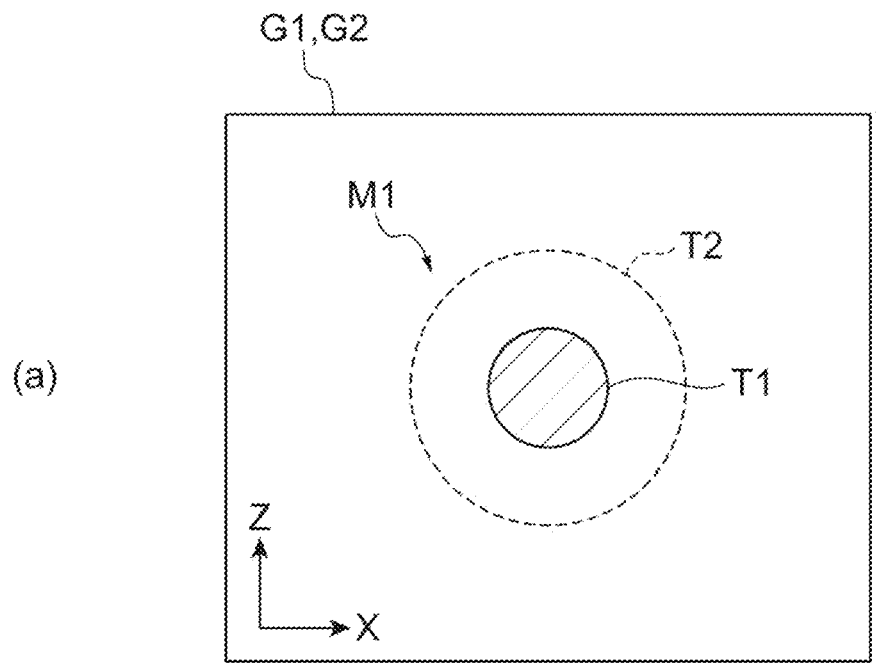
FIG. 6(a) is a diagram illustrating an example of an XZ image of a sample appearing in an XZ image.
FIG. 6(b) is a diagram illustrating an example of a YZ image of the sample appearing in a YZ image.
Figure 6:
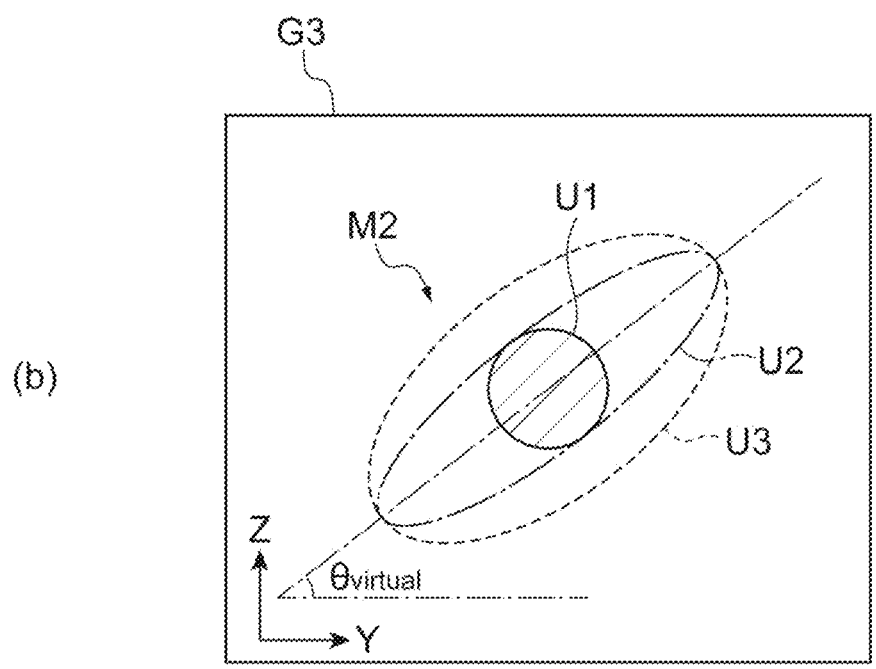

The analysis unit 33 sets the XZ images G1 and G2 in the XYZ data received from the image processing unit 32 as analysis targets. FIG. 6(a) is a diagram illustrating an example of the XZ image M1 of the sample S that appears in the XZ image G1. As a spreading component in a three-dimensional direction of the sample S in the XZ image G1, an optical aberration caused by an optical aberration of the lenses or the like included in the image formation unit 17 is included in an X-axis direction and a Z-axis direction. Therefore, as illustrated in FIG. 6(a), a real image T1 of the light image according to the observation light L3, and a blur T2 of the real image generated around the real image T1 can be included in the XZ image M1 of the sample S that appears in the XZ image G1.

Further, the analysis unit 33 may generate a plurality of YZ images G3 from the XYZ data received from the image processing unit 32, and set the YZ images G3 as analysis targets. FIG. 6(b) is a diagram illustrating an example of a YZ image M2 of the sample S that appears in the YZ image G3. As a spreading component in a three-dimensional direction of the sample S in the YZ image G3, a virtual image based on a profile of the planar light L2 with which the sample S is irradiated is included in a Y-axis direction. Therefore, as illustrated in FIG. 6(b), a real image U1 of the light image according to the observation light L3, a virtual image U2 based on the profile of the planar light L2, and a blur U3 of the virtual image and the real image can be included in the YZ image M2 of the sample S that appears in the YZ image.

Figure 7:
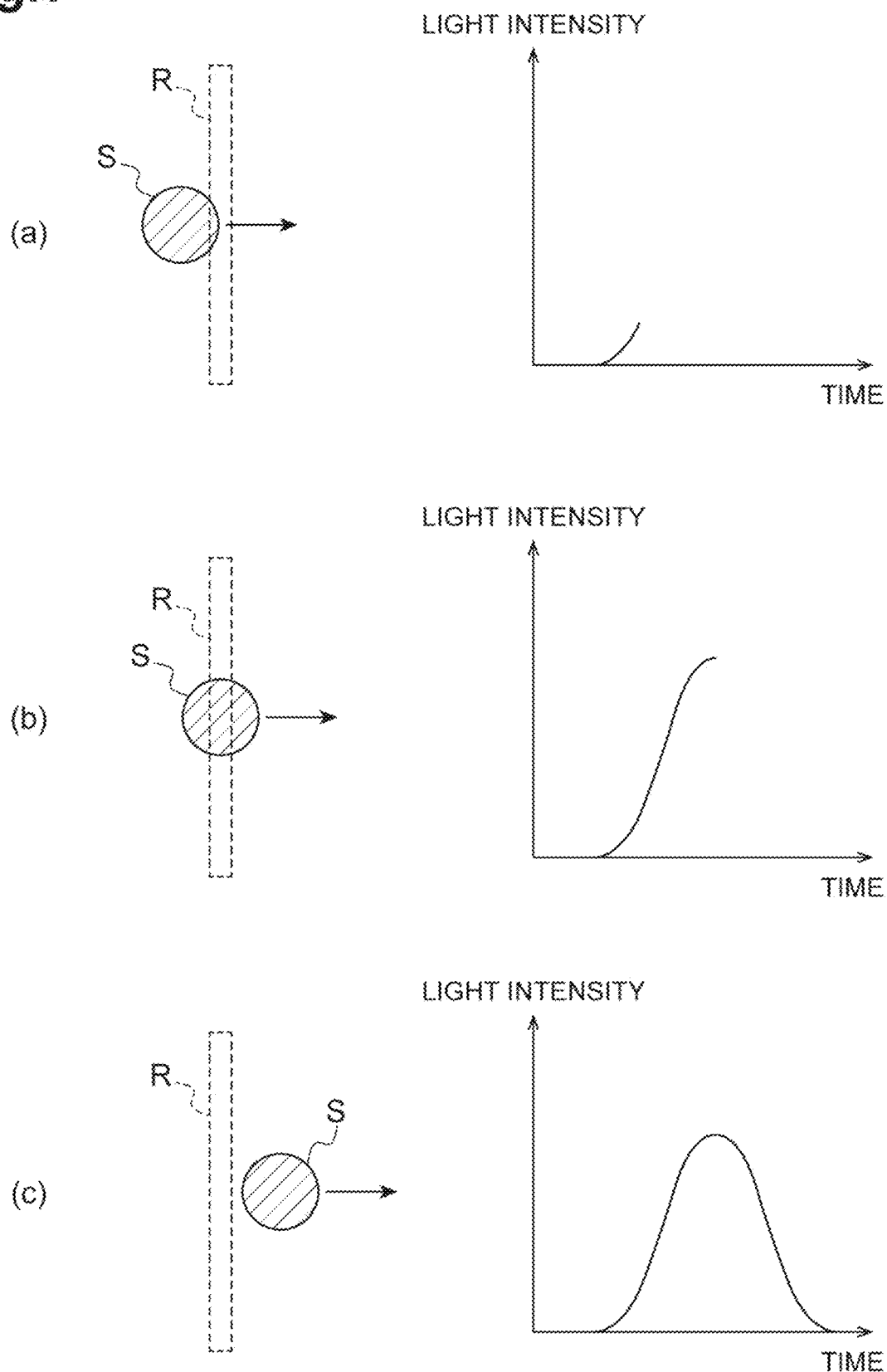
FIGS. 7(a) to 7(c) are diagrams illustrating a state in which a light intensity profile is acquired for a sample.

The analysis unit 33 analyzes a light intensity profile of the sample S in the flow direction of the fluid with the XZ images G1 and G2 or the YZ image G3 being analysis targets. The analysis unit 33 generates the light intensity profile of the sample S on the basis of the XZ images G1 and G2 in the XYZ image. FIGS. 7A to 7C are diagrams illustrating a state in which a light intensity profile is acquired for a sample. In the embodiment, the light intensity profile of the sample S is represented as a temporal waveform of the light intensity of the observation light L3. As illustrated in FIG. 7, when the sample S flowing in the flow cell 2 reaches the irradiation surface R for the planar light L2, the light intensity increases, and the light intensity has a peak when the sample S passes through a central portion of the irradiation surface R. When the sample S passes through the central portion of the irradiation surface R, the light intensity decreases, and the light intensity profile having a substantially Gaussian shape as a whole is obtained.

FIGS. 8(a) to 8(c) are diagrams illustrating a state in which the light intensity profile is acquired for samples having different sizes. Here, a case in which a size of the sample S is smaller than that in the case of FIG. 7, and the flow rate and light quantity of the sample S are the same as those in the case of FIG. 7 is illustrated. In this case, time required for the sample S to pass through the irradiation surface R is shortened, and an integrated value of the light intensity of the sample S is the same as in the case of FIG. 7. Therefore, the temporal waveform of the light intensity is a steep waveform of which a full width at half maximum is smaller and a peak is higher than in the case of FIG. 7.

Incidentally, when the flow diameter of the sample flow F1 flowing in the flow cell 2 is sufficiently larger than the size of the sample S, it is conceivable that a flow rate at an outer portion of the sample flow F1 would be slower than a flow rate at a central portion of the sample flow F1, and a difference in the flow rate would be generated. In this case, when it is assumed that the size of the sample S is the same as that in FIG. 7, the temporal waveform of the light intensity is a steep waveform of which a full width at half maximum is smaller and a peak is higher than in the case of FIG. 7, as illustrated in FIGS. 9(a) to 9(c). Therefore, it may be considered that it is difficult to discriminate the light intensity profile from the case of FIG. 8.

In the analysis unit 33, it may be assumed for simplification of a process that a flow rate of the sample flow F1 is constant at any position in a radial direction of the flow. On the other hand, the analysis unit 33 may execute analysis of the flow rate and correction of the light intensity profile based on the analyzed flow rate in consideration of a difference between the flow rate at the central portion and the flow rate at the outer portion of the sample flow F1.

Figure 10:
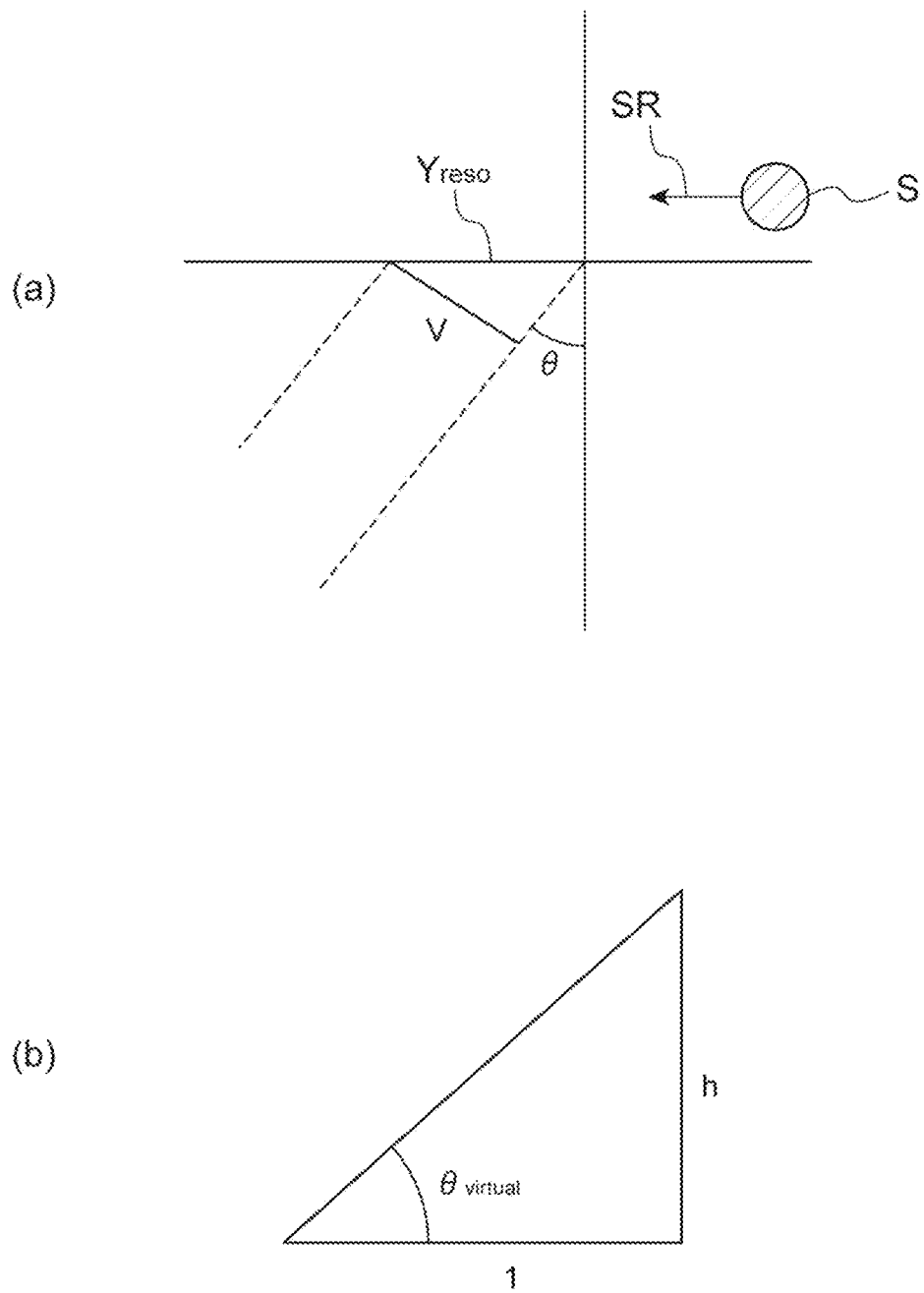
FIGS. 10(a) and 10(b) are diagrams illustrating an example of a scheme for analyzing a flow rate of a sample.

An angle of the virtual image U2 with respect to a Y-axis direction in the YZ image M2 of the sample S illustrated in FIG. 6(b) (hereinafter referred to as a "virtual image angle $\theta_{virtual}$") can be used for analysis of the flow rate. When a moving speed of the sample S (a flow rate of the sample flow F1) is SR, a field of view of the image formation unit 17 is V, an inclination angle of the observation axis with respect to the irradiation surface is θ, and a distance in a flow direction at the inclination angle θ of the field of view V is $Y_{Reso}$ as illustrated in FIG. 10(a), the following equation is established. The moving speed SR of the sample S may be calculated as the amount of movement of the sample S during an exposure period.

(Equation 1)

$$Y_{Reso} = V/\cos\theta \qquad (1)$$

Figure 8:
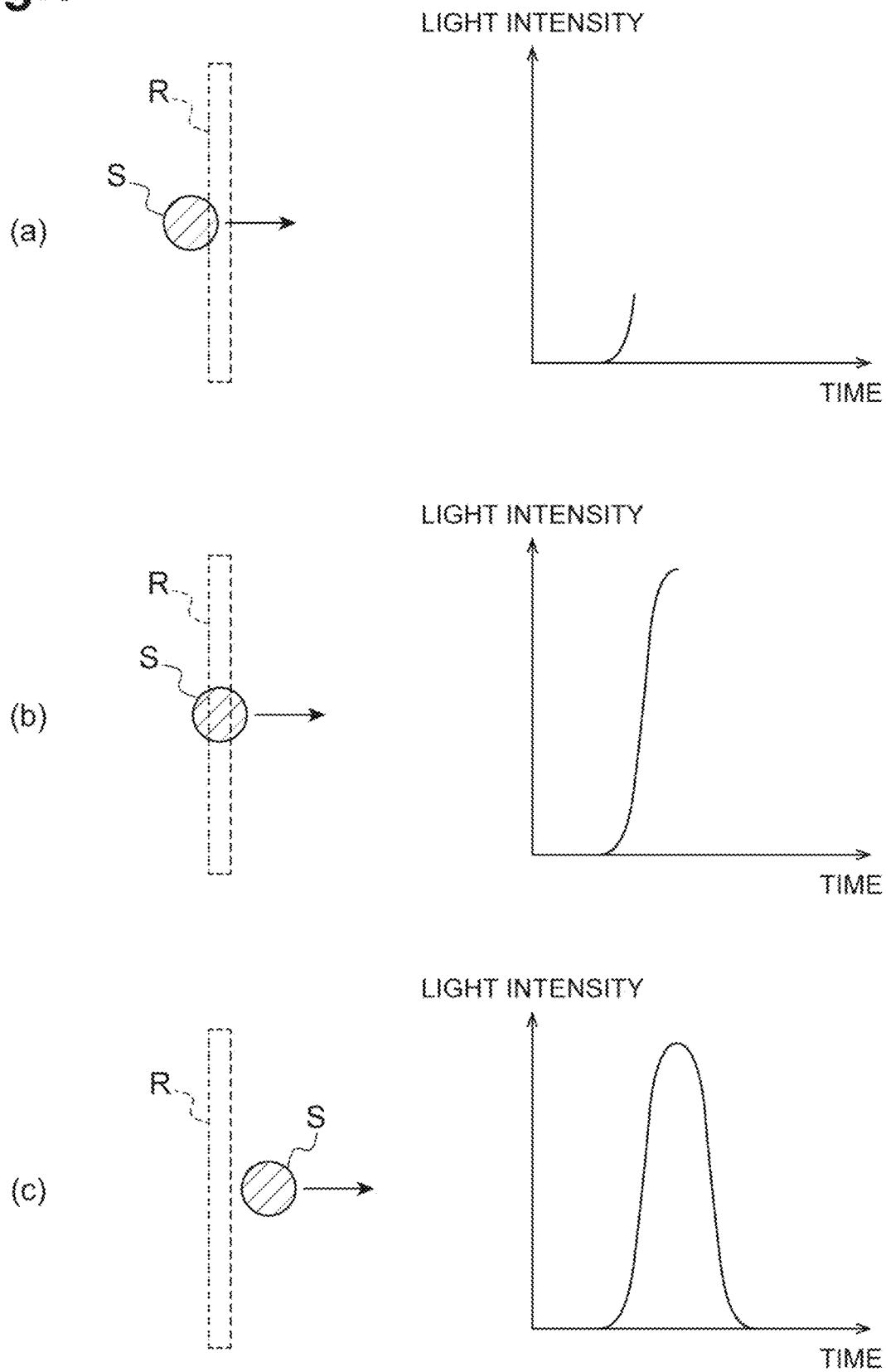
FIGS. 8(a) to 8(c) are diagrams illustrating a state in which light intensity profiles are acquired for samples having different sizes.
Figure 9:
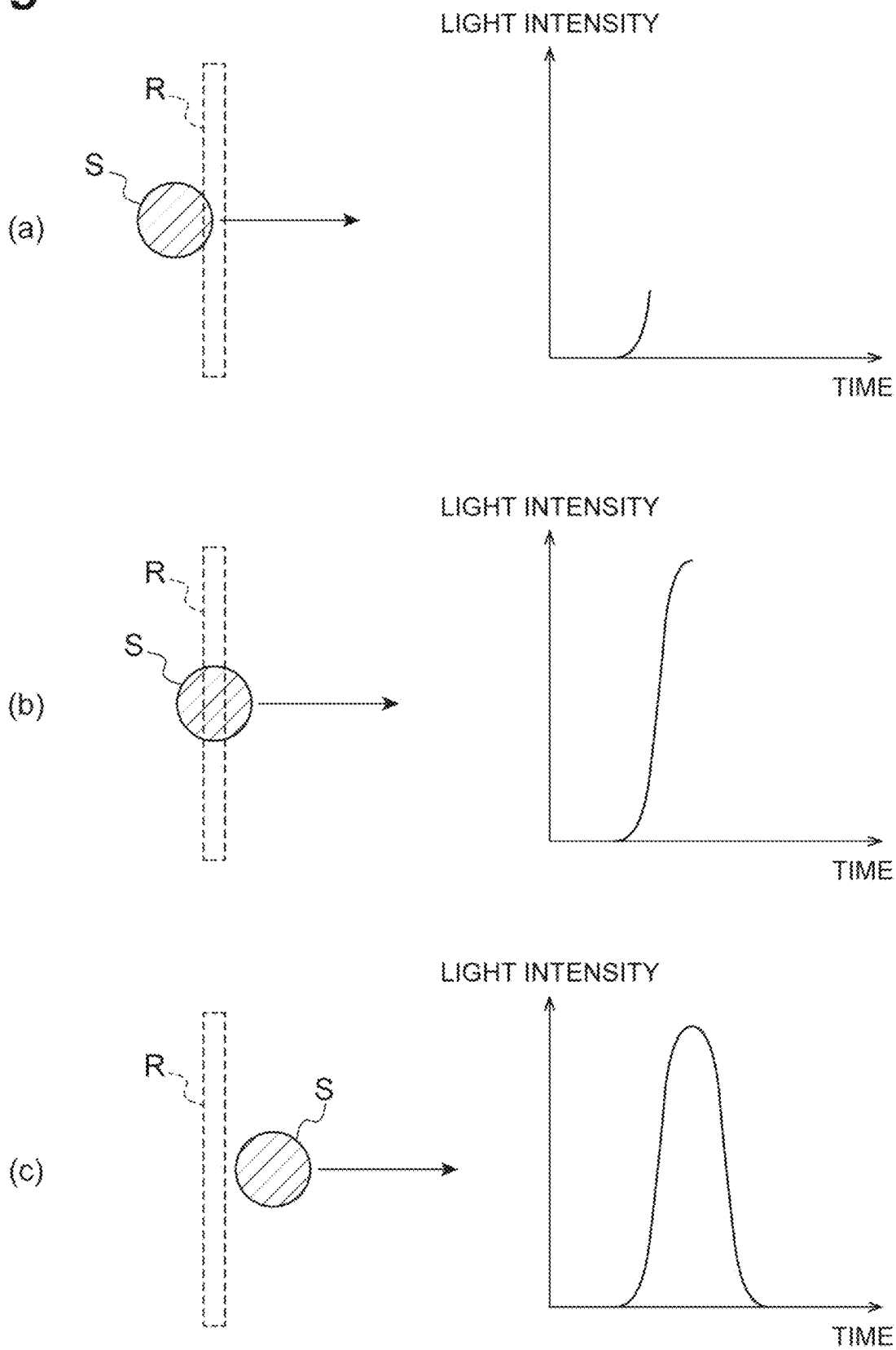
FIGS. 9(a) to 9(c) are diagrams illustrating a state in which light intensity profiles are acquired for samples having different flow rates.

Further, when a component in the Y-axis direction is 1 (normalized) and a component in the Z-axis direction is h in the YZ image M2 as illustrated in FIG. 10(b), the following equations are established. The field of view V and the inclination angle θ are known values based on a configuration of the sample observation device 1. Therefore, the moving speed SR of the sample S can be calculated using the virtual image angle $\theta_{virtual}$ on the basis of Equations (1) and (2). The analysis unit 33 corrects a time axis of a temporal waveform of the light intensity on the basis of the calculated moving speed SR. Accordingly, it is possible to accurately discriminate the light intensity profile even for the samples S having only different flow rates as illustrated in FIGS. 8 and 9. Further, it is possible to correct a difference in a background according to a flow rate.

(Equation 2)

$$h = SR/Y_{Reso} = (SR/V)\cos\theta \qquad (2)$$

The moving speed SR of the sample S may be obtained using the XZ images G1 and G2. For example, the analysis unit 33 can specify positions of the virtual image U2 based on the profile of the planar light L2 in the plurality of XZ images G1 and G2 constituting the XYZ data, or the blur U3 of the virtual image and the real image to obtain the virtual image angle $\theta_{virtual}$, and can calculate the moving speed SR of the sample S on the basis of the virtual image angle $\theta_{virtual}$ and Equations (1) and (2).

Figure 11:
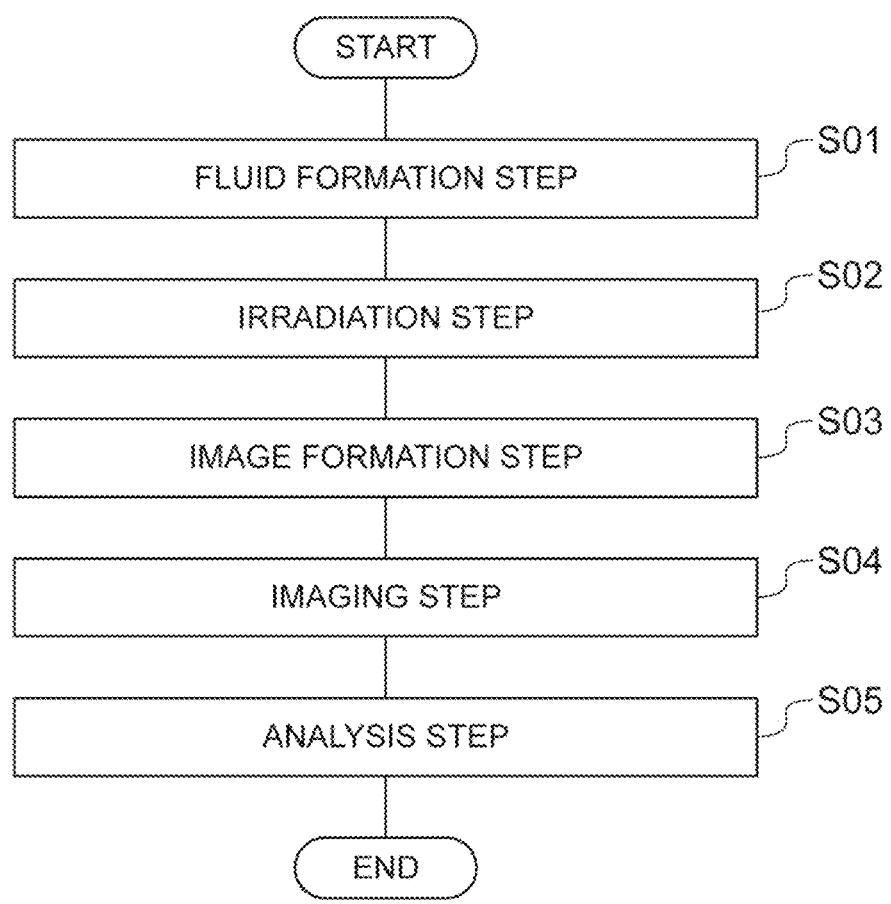
FIG. 11 is a flowchart illustrating an example of a sample observation method using the sample observation device illustrated in FIG. 1

Next, a sample observation method using the above-described sample observation device 1 will be described. FIG. 11 is a flowchart illustrating an example of the sample observation method using the sample observation device 1 illustrated in FIG. 1.

As illustrated in FIG. 11, this sample observation method includes a fluid formation step (step S01), an irradiation step (step S02), an image formation step (step S03), an imaging step (step S04), and an analysis step (step S05).

In the fluid formation step, a fluid containing the samples S flows in the flow cell 2. In the fluid formation step, a laminar flow is formed of the sample flow F1 and the sheath flow F2 in the pipe 5 of the flow cell 2, for example, through pressure adjustment using a compressor. Accordingly, the sample flow F1 surrounded by the sheath flow F2 is formed in the flow cell 2, and the samples S sequentially flow in the flow cell 2.

In the irradiation step, the sample S is irradiated with the planar light L2. In the irradiation step, when the measurement start operation is input by the user, the light source 15 is driven on the basis of a control signal from the computer 14, and the light L1 is output from the light source 15. The light L1 output from the light source 15 is shaped into the planar light L2 by the planar light formation unit 16, and the sample S flowing in the flow cell 2 is irradiated with the light L1.

In the image formation step, the observation light L3 generated on the sample S due to the irradiation with the planar light L2 is formed as an image by the image formation unit 17. In the image formation step, the observation light L3 is formed as an image on the image formation surface of the two-dimensional imaging element 20 according to the observation axis P2 inclined with respect to the irradiation surface R.

In the imaging step, a light image including at least a cross section of the fluid among the light images of the observation light L3 formed by the image formation unit 17 is captured. In the imaging step, the light image is captured through the subarray readout of the two-dimensional imaging element 20, for example. The plurality of XZ images G1 in the Y-axis direction output from the two-dimensional imaging element 20 are processed by the image processing unit 32, and a plurality of XZ images G1 with a reduced background are generated. The plurality of generated XZ images G1 are output to the analysis unit 33 as XYZ data.

In the analysis step, the light intensity profile of the sample S in the flow direction of the fluid is analyzed. In the analysis step, the temporal waveform of the light intensity of the observation light L3 is analyzed for each sample S on the basis of the XYZ data. Further, in the analysis step, the flow rate of the sample S may be calculated using the virtual image angle $\theta_{virtual}$ of the sample S, and the light intensity profile may be corrected on the basis of the calculated flow rate. The correction of the light intensity profile based on the calculated flow rate is effective, for example, when the flow rate at the central portion and the flow rate at the outer portion of the sample flow F1 as described above are different or when the light intensity profiles obtained through different observations are compared.

As described above, in the sample observation device 1, the sample S flowing in the flow cell 2 is irradiated with the planar light L2, and the observation light L3 from the sample S is formed as an image by the image formation unit 17 having the observation axis P2 inclined with respect to the irradiation surface R for the planar light L2. Further, the observation light L3 formed as an image by the image formation unit 17 is imaged by the two-dimensional imaging element 20, and image data based on the light image including at least a cross section of the fluid is generated. Therefore, even when there are a plurality of samples S in the cross section of the fluid, the analysis unit 33 can separate the observation light L3 from the respective samples S and analyze the light intensity profile. Therefore, even when the throughput has been improved, the samples S can be appropriately observed.

Further, in the sample observation device 1, the optical axis P1 of the planar light L2 due to the irradiation unit 11 is orthogonal to the incidence surface 5a of the planar light L2 in the flow cell 2. Further, the optical axis P1 of the planar light L2 from the irradiation unit 11 is orthogonal to a direction in which the fluid flows in the flow cell 2. Accordingly, position correction or the like of the image data acquired by the two-dimensional imaging element 20 becomes unnecessary, and the light intensity profile analysis process can be facilitated.

Further, in the sample observation device 1, the analysis unit 33 analyzes the flow rate of the sample S on the basis of the image data, and corrects the light intensity profile on the basis of the analyzed flow rate. The flow rate of the sample flow F1 in the flow cell 2 may be different between a center side of the sample flow F1 and surroundings thereof. In this case, it is conceivable that it would be difficult to discriminate whether the difference in light intensity profile between the samples S is based on a difference in size between the samples S or on a difference between flow rates. Therefore, when the flow rate of the sample S is analyzed, the flow rate unevenness of the sample flow F1 can be allowed, and control of flow cytometry is facilitated. Further, analysis accuracy of the sample S can be increased through correction of the light intensity profile.

In the sample observation device 1, the light image including at least a cross section of the fluid among the light images from the observation light L3 formed by the image formation unit 17 can be captured through subarray readout of the two-dimensional imaging element 20. In this case, since a frame rate of the two-dimensional imaging element 20 can be increased, the further improvement of a throughput can be achieved.

In the embodiment, since both a position at which the sample S flows in the flow cell 2 and the flow rate can be corrected, control of the flow cytometry can be performed roughly. Therefore, the embodiment can also be applied to a flow cytometry in which the sheath flow F2 is not used. Further, in the embodiment, it is possible to separate the observation light L3 generated from the sample S and the autofluorescent light generated from the sample flow F1 and the sheath flow F2 flowing in the flow cell 2.

The present invention is not limited to the above embodiment. For example, the optical axis P1 of the planar light L2 and the incidence surface 5a of the flow cell 2 may not necessarily be orthogonal to each other, and the optical axis P1 of the planar light L2 and the flow direction of the sample S may not necessarily be orthogonal to each other.

Further, a plurality of pairs of image formation unit 17 and two-dimensional imaging elements 20 may be disposed. In this case, the observation range can be expanded, and observation light L3 having a plurality of different wavelengths can be observed. In this case, a plurality of two-dimensional imaging elements 20 may be disposed for a single image formation unit 17, or a single two-dimensional imaging element 20 may be disposed for a plurality of image formation units 17. The light source 15 may include a plurality of light sources that output light having different wavelengths. In this case, the sample S can be irradiated with the planar light L2 having different wavelengths as excitation light.

Further, a prism may be disposed in the image formation unit 17 to reduce astigmatism. In this case, for example, a prism may be disposed on the rear side of the objective lens 18 (between the objective lens 18 and the two-dimensional imaging element 20). As measures against defocusing, an imaging surface of the two-dimensional imaging element 20 may be inclined with respect to the observation axis P2. In addition, for example, a configuration in which a dichroic mirror or a prism is disposed between the image formation unit 17 and the two-dimensional imaging element 20 to perform wavelength separation of the observation light L3 may be adopted.

Figure 12:
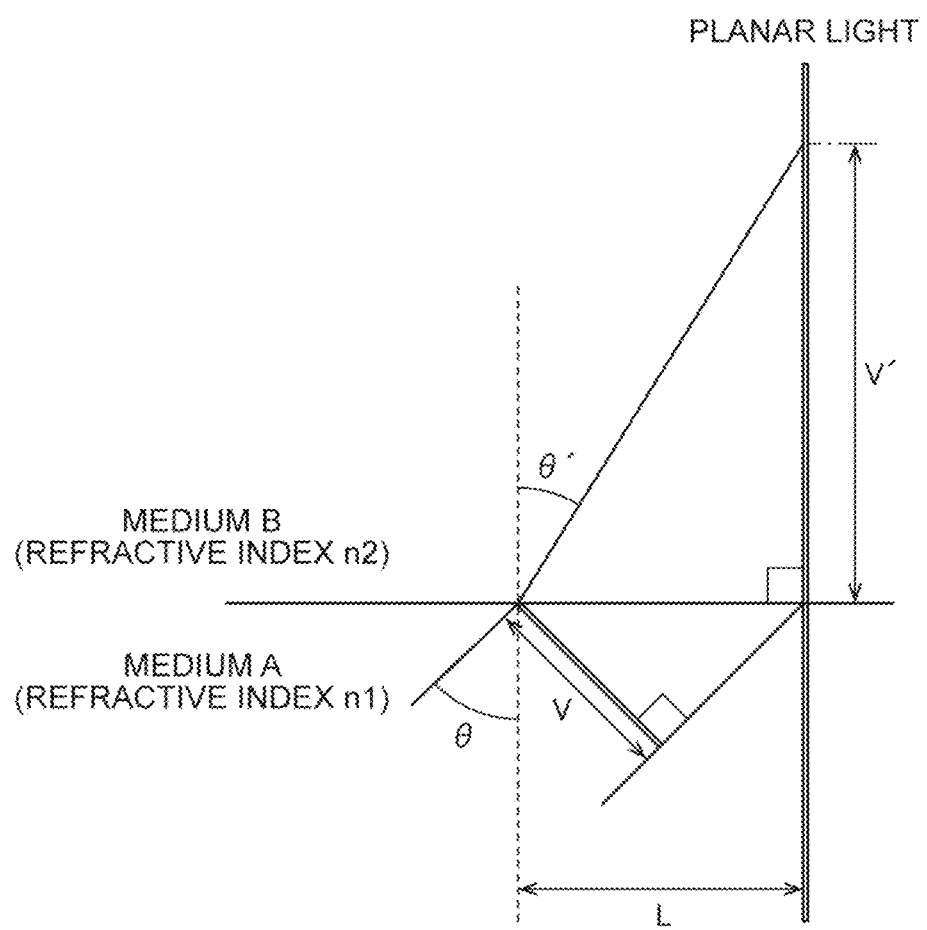
FIG. 12 is a diagram illustrating an example in which a field of view is calculated in the sample observation device.

When an optical element such as a prism is disposed in the image formation unit 17, improvement of the Z-direction resolution of the observation image can be achieved. Hereinafter, this point will be further described. FIG. 12 is a diagram illustrating an example in which the field of view is calculated in the sample observation device. In the example illustrated in FIG. 12, it is assumed that the image formation unit 17 is located in a medium A having a refractive index n1, and the irradiation surface of the planar light is located in a medium B having a refractive index n2. When a field of view in the image formation unit 17 is V, a field of view in the irradiation surface is V', an inclination angle of the observation axis with respect to the irradiation surface is θ, a refraction angle at a boundary surface between the medium A and the medium B is θ', and a distance at an interface between the medium A and the medium B at the inclination angle θ of the field of view V is L, Equations (3) to (5) below are established.

(Equation 3)

$$L = V/\cos\theta \quad (3)$$

(Equation 4)

$$\sin\theta' = (n1/n2)\sin\theta \quad (4)$$

(Equation 5)

$$V' = L/\tan\theta' \quad (5)$$

Figure 13:
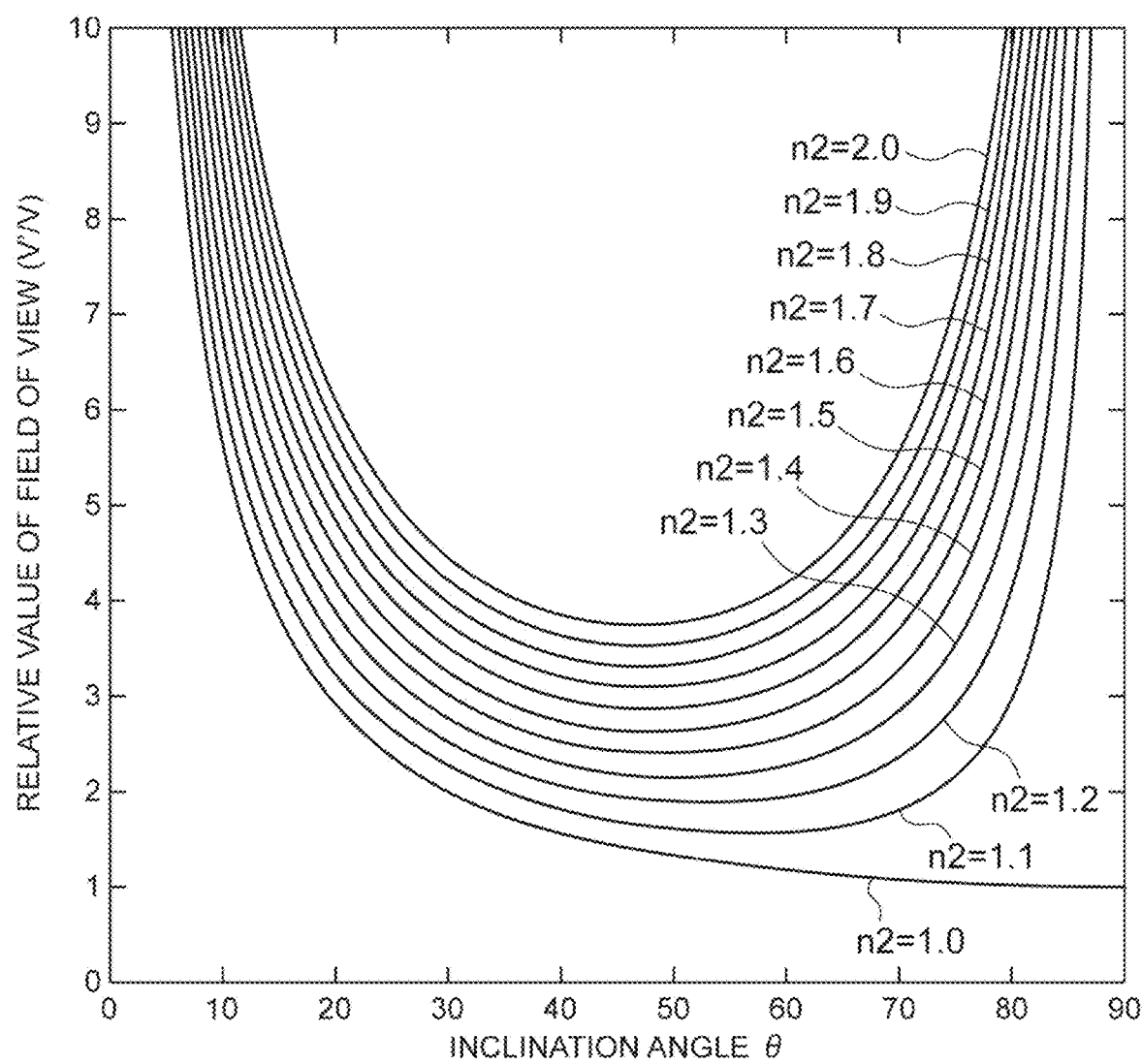
FIG. 13 is a diagram illustrating a relationship between an inclination angle of an observation axis and resolution.

Further, FIG. 13 is a diagram illustrating a relationship between the inclination angle of the observation axis and the resolution. In FIG. 13, a horizontal axis indicates the inclination angle θ of the observation axis, and a vertical axis is a relative value V'/V of the field of view. The value V'/V when the refractive index n1 of the medium A is 1 (air) and the refractive index n2 of the medium B is changed from 1.0 to 2.0 in increments of 0.1 is plotted with respect to the inclination angle θ. It is shown that the smaller the value V'/V, the higher the resolution in a depth direction of the sample (hereinafter referred to as a "Z-direction resolution"), and the greater the value, the lower the Z-direction resolution.

It can be seen from a result illustrated in FIG. 13 that when the refractive index n1 of the medium A and the refractive index n2 of the medium B are equal, the value V'/V is inversely proportional to the inclination angle θ. Further, it can be seen that when the refractive index n1 of the medium A and the refractive index n2 of the medium B are different, the value V'/V draws a parabola with respect to the inclination angle θ. It can be seen from this result that the Z-direction resolution can be controlled using a refractive index of a disposition space of the sample S, a refractive index of a disposition space of the image formation unit 17, and the inclination angle θ of the observation axis. It can be seen that a better Z-direction resolution can be obtained in a case in which the inclination angle θ is in a range of 10° to 80° as compared with a case in which the inclination angle θ is smaller than 10° and exceeds 80°.

Further, it can be seen from the result illustrated in FIG. 13 that the inclination angle θ at which the Z-direction resolution is maximized tends to decrease as the difference between the refractive index n1 and the refractive index n2 increases. When the refractive index n2 is in a range of 1.1 to 2.0, the inclination angle θ at which the Z-direction resolution is maximized is in a range of about 47° to about 57°. For example, when the refractive index n2 is 1.33 (water), the inclination angle θ at which the Z-direction resolution is maximized is estimated to be about 52°. Further, for example, when the refractive index n2 is 1.53 (glass), the inclination angle θ at which the Z-direction resolution is maximized is estimated to be about 48°.

As can be seen from Equations (3) to (5) above, parameters for determining the Z-direction resolution are L and θ', L is determined from θ, and θ' is determined from θ and (n1/n2). Therefore, the Z-direction resolution is determined from two parameters of θ and (n1/n2) in a state in which V is determined. Since (n1/n2) is determined according to a measurement environment, θ is adjusted to increase the Z-direction resolution. However, in simple adjustment of θ, there is a theoretical limit value in improving the Z-direction resolution, as illustrated in FIG. 13.

Figure 14:
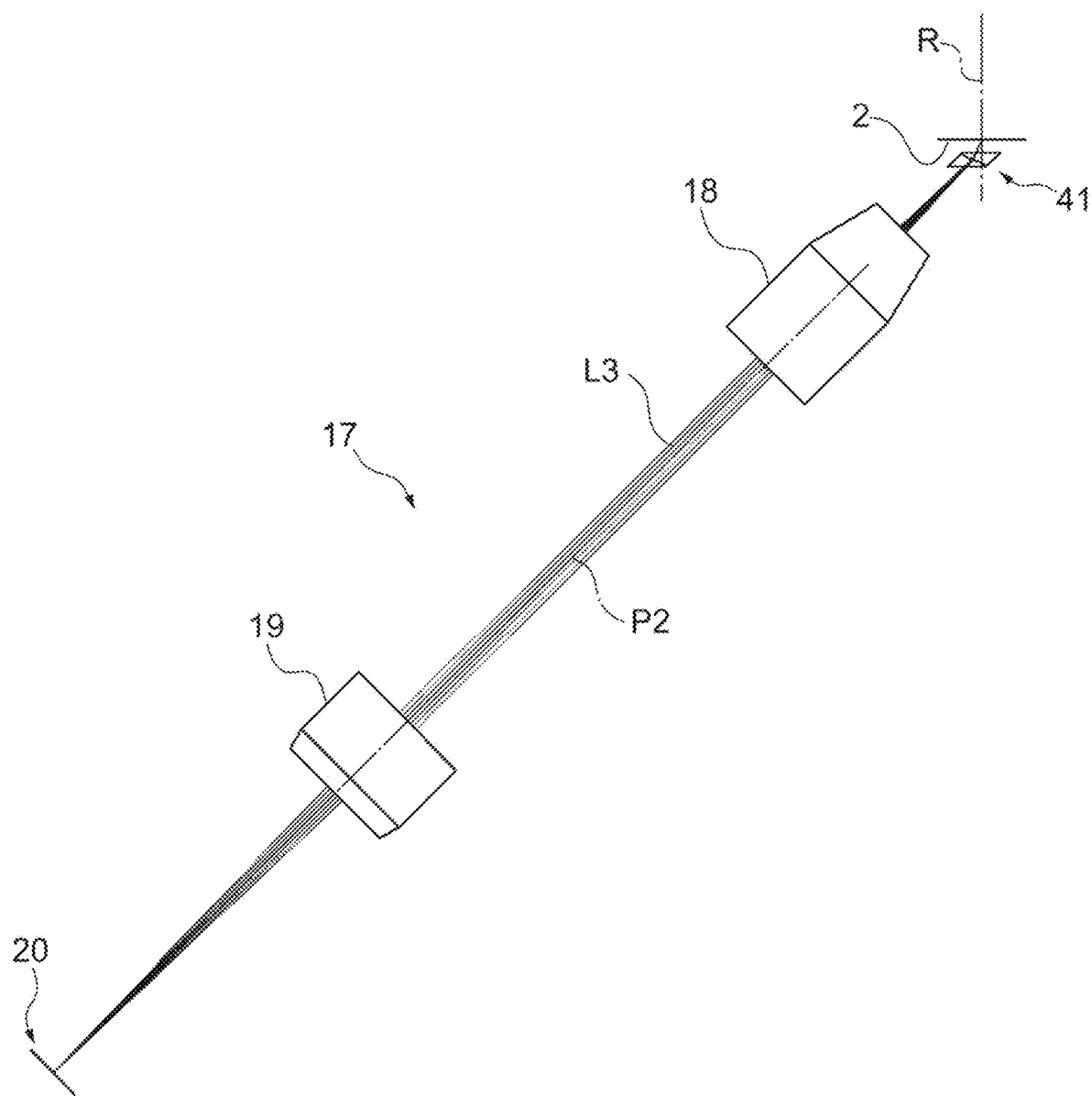
FIG. 14 is a diagram illustrating an example in which a first optical element is disposed in the image formation unit.

On the other hand, in the example of FIG. 14, the image formation unit 17 includes an objective lens 18 and an image formation lens 19, and a first optical element 41 is disposed between the flow cell 2 and the objective lens 18 in the image formation unit 17. The first optical element 41 is an optical element having a refractive index greater than that of the disposition space of the image formation unit 17. The first optical element 41 is an optical element that increases an inclination angle θs (see FIGS. 15 and 16) of the observation light L3 emitted from the sample S with respect to the irradiation surface R for the planar light L2, in comparison with a case in which the first optical element 41 is not disposed. The disposition space of the image formation unit 17 is filled with, for example, a medium such as air, water, or oil. In the example of FIG. 14, the image formation unit 17 is disposed in the air.

The first optical element 41 includes, for example, a wedge prism. The wedge prism is a prism in which one main surface and the other main surface are parallel in one direction, but the other main surface is inclined at a certain angle with respect to the one main surface in the other direction orthogonal to the one direction. That is, the wedge prism is a prism of which a thickness changes uniformly in the one direction and does not change in the other direction orthogonal to the one direction. Therefore, the wedge prism functions as a non-axisymmetric optical element that bends rays on one axis of the observation light L3 with a predetermined declination according to an incident position, but does not bend rays on the other axis of the observation light L3 orthogonal to the one axis.

Figure 15:
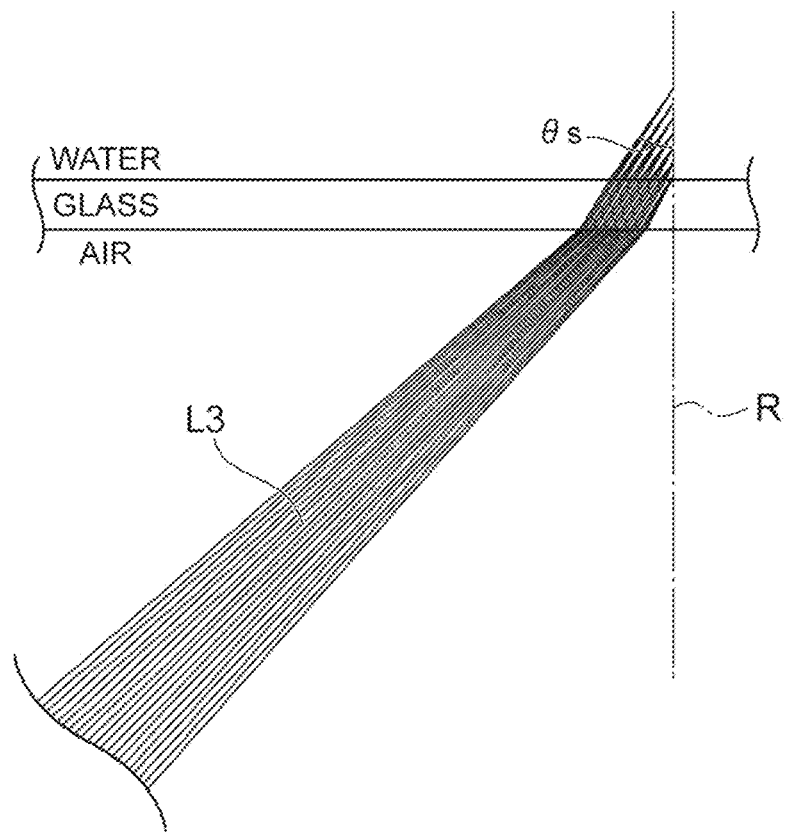
FIG. 15 is a diagram illustrating rays of the observation light when the first optical element is not disposed.
Figure 16:
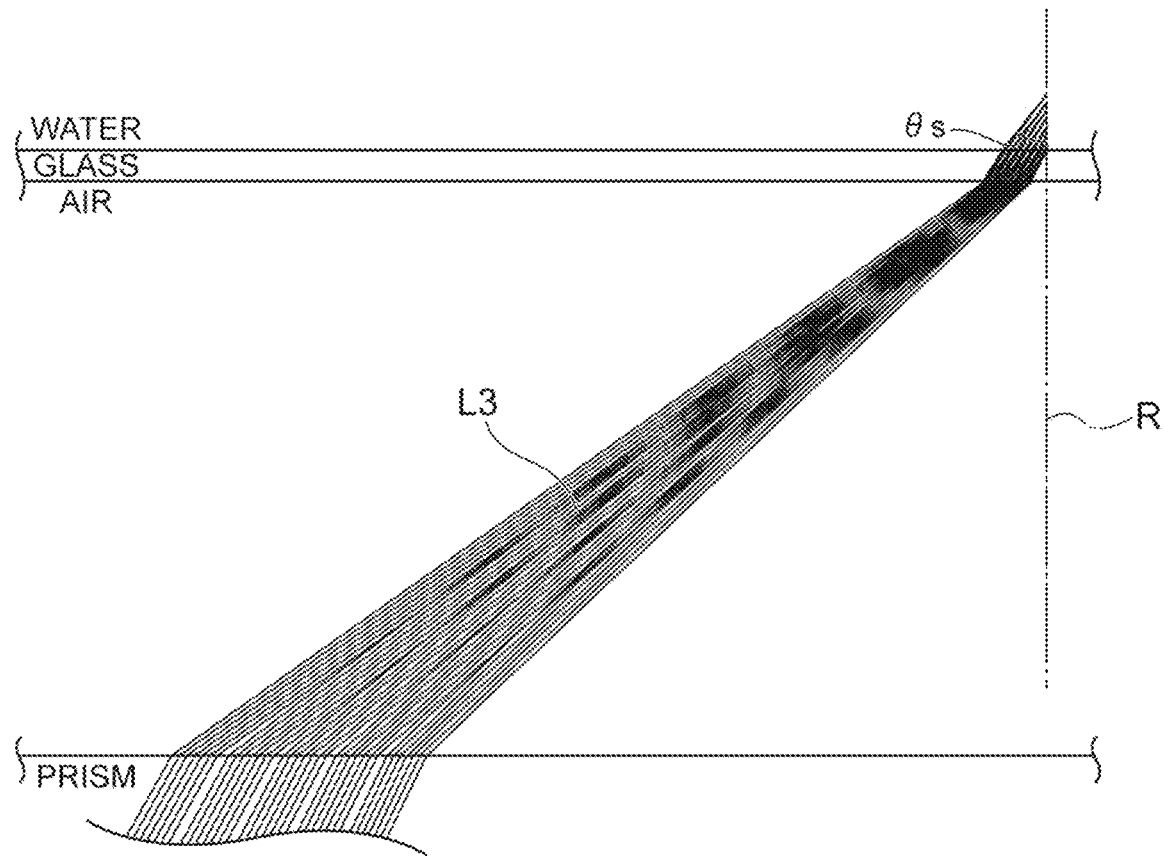
FIG. 16 is a diagram illustrating rays of the observation light when the first optical element is disposed.

In the example of FIG. 14, the first optical element 41 is a doublet prism in which a pair of wedge prisms are combined. The doublet prism is configured of abutting inclined surfaces of a pair of wedge prisms and is disposed at a position close to the flow cell 2 so that a flat surface of one wedge prism is parallel to a side surface portion of the pipe 5 of the flow cell 2 on an optical path of the observation light L3 between the flow cell 2 and the objective lens 18. In a case in which an inclination angle θ of the observation axis P2 of the image formation unit 17 is 45°, the inclination angle θs of the observation light L3 emitted from the sample S is about 32° as illustrated in FIG. 15 when the first optical element 41 is not disposed in the image formation unit 17. In this case, the Z-direction resolution is estimated to be about 2.2. On the other hand, when the first optical element 41 is disposed in the image formation unit 17, the inclination angle θs of the observation light L3 emitted from the sample S is about 35° as illustrated in FIG. 16. In this case, it is estimated that the Z-direction resolution is improved to about 1.95.

Therefore, improvement of the Z-direction resolution of the observation image can be achieved due to the disposition of the first optical element 41 even when the observation axis P2 of the image formation unit 17 is inclined with respect to the irradiation surface R for the planar light L2. Further, when the first optical element 41 is the wedge prism, reduction of the astigmatism of the observation light L3 is achieved, and when the first optical element 41 is the doublet prism that is a combination of a pair of wedge prisms, reduction of chromatic aberration of the observation light L3 is also achieved.

Although a slight space is provided between a flat surface of the first optical element 41 and the side surface portion of the pipe 5 of the flow cell 2 in the embodiment of FIG. 14, the flat surface of the first optical element 41 and the side surface portion of the pipe 5 of the flow cell 2 may be in close contact with each other. In this case, the inclination angle θs of the observation light L3 emitted from the sample S can be further increased to some degree, and further improvement of the Z-direction resolution can be achieved. Further, aberration correction of the observation light L3 is facilitated.

Figure 17:
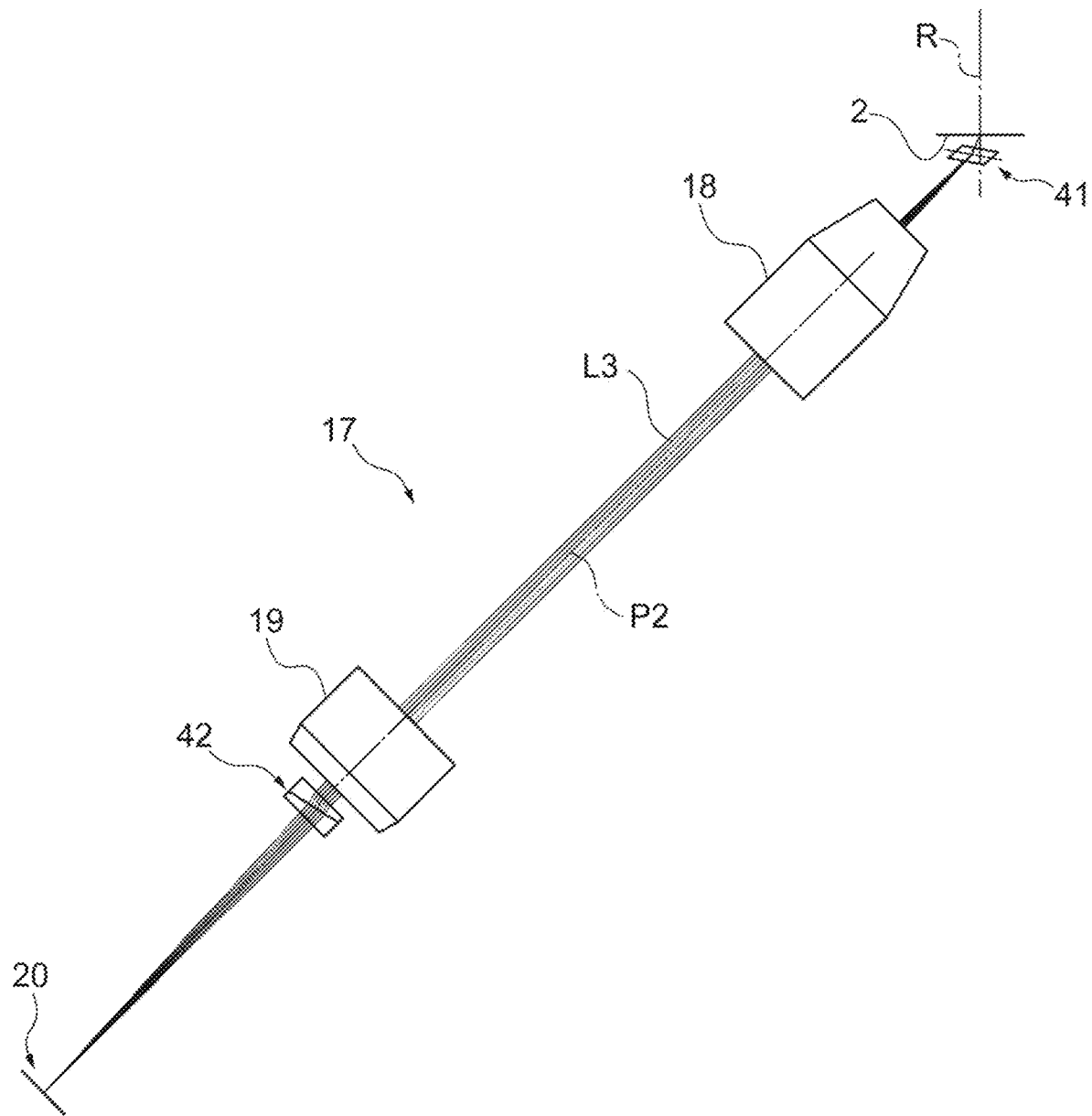
FIG. 17 is a diagram illustrating a disposition example of a second optical element in the image formation unit.

Further, in the image formation unit 17, a second optical element 42 may be disposed between the image formation lens 19 and the two-dimensional imaging element 20, as illustrated in FIG. 17. The second optical element 42 is a non-axisymmetric optical element that bends rays on one axis of the observation light L3 and does not bend rays on the other axis orthogonal to the one axis. In the example of FIG. 17, the second optical element 42 is a doublet prism in which a pair of wedge prisms have been combined. The doublet prism is disposed at a position close to the image formation lens 19 so that a flat surface on one side is orthogonal to the observation axis P2 and an inclined surface on the other side is inclined with respect to the observation axis P2 on an optical path of the observation light L3 between the image formation lens 19 and the two-dimensional imaging element 20. With this disposition of the second optical element 42, the reduction of the astigmatism of the observation light L3 can be further achieved. Further, when the second optical element 42 is the wedge prism, the reduction of the astigmatism of the observation light L3 can be further achieved, and the second optical element 42 is the doublet prism that is a combination of a pair of wedge prisms such that reduction of the chromatic aberration of the observation light L3 can be further achieved.

REFERENCE SIGNS LIST

1: Sample observation device
2: Flow cell
5*a*: Incidence surface
11: Irradiation unit
17: Image formation unit
18: Objective lens
19: Image formation lens
20: Two-dimensional imaging element
33: Analysis unit
41 First optical element
42: Second optical element
L2: Planar light
L3: Observation light
S: Sample
R: Irradiation surface
P1: Optical axis of planar light
P2: Observation axis

The invention claimed is:

1. A device comprising:
a flow cell, and a fluid containing samples flowing in the flow cell;
an irradiation optical system that irradiates the samples flowing in the flow cell with planar light at an incidence surface, the planer light being irradiated orthogonal to a Y flow direction in which the samples flow;
an imaging optical system having an observation axis inclined with respect to an irradiation surface for the planar light, the imaging optical system forms an image of observation light generated in the sample due to the irradiation with the planar light, the incidence surface of the planar light and an irradiation surface of the observation light, in the flow cell, are the same surface, a side surface of a tube constituting the flow cell is the incidence surface of the planar light and the irradiation surface of the observation light, and an inclination angle of the observation axis with respect to the irradiation surface for the planar light is 30° to 65°;
a two-dimensional image sensor that captures a plurality of XZ light images of a XZ plane orthogonal to the Y flow direction including at least a cross section of the fluid among XZ light images according to the observation light formed by the image optical system, and outputs the plurality of XZ light images of the XZ plane orthogonal to the Y flow direction as image data, the plurality of XZ light images of the XZ plane orthogonal to the Y flow direction capturing the samples flowing in the Y flow direction and capturing the samples passing the planer light by observing the planer light with the inclination angle of the observation axis, wherein the irradiation optical system, the imaging optical system, and the two-dimensional image sensor are located on a same side from the flow cell; and
a computer that analyzes a light intensity profile of the sample in the Y flow direction of the fluid on the basis of the image data,
wherein the imaging optical system includes an objective lens, and a first prism disposed between the flow cell and the objective lens, and
the first prism has a refractive index greater than that of a disposition space of the imaging optical system, and the first prism increases a second inclination angle with respect to the irradiation surface for the planar light of the observation light emitted from the sample as compared with a case in which the first prism is not disposed,
the first prism is a non-axisymmetric prism that bends rays on one axis of the observation light with a predetermined declination according to an incident position and does not bend rays on an axis orthogonal to the one axis, and
the imaging optical system includes an image formation lens, the image formation lens forms an image of the observation light from the object lens on the two-dimensional image sensor.

2. The device according to claim 1, wherein an optical axis of the planar light according to the irradiation optical system is orthogonal to the incidence surface of the planar light in the flow cell.

3. The device according to claim 1, wherein an optical axis of the planar light according to the irradiation optical system is orthogonal to the Y flow direction of the fluid in the flow cell.

4. The device according to claim 1, wherein the computer analyzes a flow rate of the sample on the basis of the image data.

5. The device according to claim 4, wherein the computer corrects the light intensity profile on the basis of the flow rate of the sample.

6. The device according to claim 1, wherein the two-dimensional image sensor captures, through subarray readout, the plurality of XZ light images including at least the cross section of the fluid among the XZ light images according to the observation light formed by the imaging optical system.

7. The device according to claim 1, wherein the first prism is a wedge prism.

8. The device according to claim 1, wherein the first prism is a doublet prism, the doublet prism being a combination of a pair of wedge prisms.

9. The device according to claim 1,
wherein the image formation lens is disposed on a rear side of the objective lens,
the imaging optical system further includes a second prism disposed between the image formation lens and the two-dimensional image sensor, and
the second prism is a non-axisymmetric prism that bends rays on one axis of the observation light and does not bend rays on an axis orthogonal to the one axis.

10. The device according to claim 9, wherein the second prism is a wedge prism.

11. The device according to claim 9, wherein the second prism is a doublet prism, the doublet prism being a combination of a pair of wedge prisms.

12. A method comprising:
causing a fluid containing samples to flow in a flow cell;
irradiating, by an irradiation optical system, the samples flowing in the flow cell with planar light at an incidence surface, the planer light being irradiated orthogonal to a Y flow direction in which the samples flow;
forming an image of observation light generated in the sample due to the irradiation with the planar light by an imaging optical system having an observation axis inclined with respect to an irradiation surface for the planar light, the incidence surface of the planar light and an irradiation surface of the observation light, in the flow cell, are the same surface, a side surface of a tube constituting the flow cell is the incidence surface of the planar light and the irradiation surface of the observation light, and an inclination angle of the observation axis with respect to the irradiation surface for the planar light is 30° to 65°;
capturing, by a two-dimensional image sensor, a plurality of XZ light images of a XZ plane orthogonal to the Y flow direction including at least a cross section of the fluid among XZ light images according to the observation light formed by the imaging optical system, and outputting the plurality of XZ light images of the XZ plane orthogonal to the Y flow direction as image data, the plurality of XZ light images of the XZ plane orthogonal to the Y flow direction capturing the samples flowing in the Y flow direction and capturing the samples passing the planer light by observing the planer light with the inclination angle of the observation axis wherein the irradiation optical system, the imaging optical system, and the two-dimensional image sensor are located on a same side from the flow cell; and
analyzing a light intensity profile of the sample in the Y flow direction of the fluid on the basis of the image data,
wherein the capturing includes using an objective lens, and a first prism disposed between the flow cell and the objective lens, and
the first prism has a refractive index greater than that of a disposition space of the imaging optical system, and the first prism increases a second inclination angle with respect to the irradiation surface for the planar light of the observation light emitted from the sample as compared with a case in which the first prism is not disposed,
the first prism is a non-axisymmetric prism that bends rays on one axis of the observation light with a predetermined declination according to an incident position and does not bend rays on an axis orthogonal to the one axis, and
the imaging optical system includes an image formation lens, the image formation lens forms an image of the observation light from the object lens on the two-dimensional image sensor.

13. The method according to claim 12, wherein the irradiation includes causing an optical axis of the planar light to be orthogonal to the incidence surface of the planar light in the flow cell.

14. The method according to claim 12, wherein the irradiation includes causing an optical axis of the planar light to be orthogonal to the Y flow direction of the fluid in the flow cell.

15. The method according to claim 12, wherein the analyzing includes analyzing a flow rate of the sample on the basis of the image data.

16. The method according to claim 15, wherein the analyzing includes correcting the light intensity profile on the basis of the flow rate of the sample.

17. The method according to claim 12, wherein the capturing includes capturing, through subarray readout of the two-dimensional image sensor, the plurality of XZ light images including at least the cross section of the fluid among the XZ light images according to the observation light.

18. The method according to claim 12, wherein the first prism is a wedge prism.

19. The method according to claim 12, wherein the first prism is a doublet prism, the doublet prism being a combination of a pair of wedge prisms.

20. The method according to claim 12,
wherein the image formation lens is disposed on a rear side of the objective lens,
the imaging optical system further includes a second prism disposed between the image formation lens and the two-dimensional image sensor, and
the second prism is a non-axisymmetric prism that bends rays on one axis of the observation light and does not bend rays on an axis orthogonal to the one axis.

21. The method according to claim 20, wherein the second prism is a wedge prism.

22. The method according to claim 20, wherein the second prism is a doublet prism, the doublet prism being a combination of a pair of wedge prisms.

* * * * *